United States Patent
He et al.

(10) Patent No.: US 12,341,903 B2
(45) Date of Patent: Jun. 24, 2025

(54) FILLING DIGITAL DOCUMENTS USING MULTI-TIERED USER IDENTITY MODELS BASED ON DECENTRALIZED IDENTITY

(71) Applicant: Adobe Inc., San Jose, CA (US)

(72) Inventors: Songlin He, Hangzhou (CN); Tong Sun, San Jose, CA (US); Nedim Lipka, Santa Clara, CA (US); Curtis Wigington, San Jose, CA (US); Rajiv Jain, Vienna, VA (US); Anindo Roy, San Jose, CA (US)

(73) Assignee: Adobe Inc., San Jose, CA (US)

(*) Notice: Subject to any disclaimer, the term of this patent is extended or adjusted under 35 U.S.C. 154(b) by 385 days.

(21) Appl. No.: 17/819,540

(22) Filed: Aug. 12, 2022

(65) Prior Publication Data
US 2024/0056309 A1 Feb. 15, 2024

(51) Int. Cl.
*H04L 9/00* (2022.01)
*G06F 21/31* (2013.01)
*G06F 40/174* (2020.01)
*H04L 9/32* (2006.01)

(52) U.S. Cl.
CPC .......... *H04L 9/3247* (2013.01); *G06F 21/31* (2013.01); *G06F 40/174* (2020.01)

(58) Field of Classification Search
CPC ....... H04L 9/3247; G06F 21/31; G06F 40/174
See application file for complete search history.

(56) References Cited

U.S. PATENT DOCUMENTS

| | | | | |
|---|---|---|---|---|
| 5,872,640 A | * | 2/1999 | Cohen | G06F 40/174 715/236 |
| 7,251,782 B1 | * | 7/2007 | Albers | G06F 3/0481 715/708 |
| 7,305,129 B2 | * | 12/2007 | Chellapilla | G06V 30/1444 382/174 |
| 9,672,336 B1 | * | 6/2017 | Spence | G06F 21/32 |
| 10,438,437 B1 | * | 10/2019 | Herrington | H04L 63/067 |
| 11,860,984 B1 | * | 1/2024 | Ashley | G06F 16/9535 |
| 2002/0062342 A1 | * | 5/2002 | Sidles | H04L 67/561 715/224 |
| 2005/0183003 A1 | * | 8/2005 | Peri | G06F 40/174 715/226 |

(Continued)

OTHER PUBLICATIONS

Dingle, "Decentralized Identity: The Basics of Decentralized Identity", Mar. 24, 2022, 12 pages https://techcommunity.microsoft.com/t5/security-compliance-and-identity/decentralized-identity-the-basics-of-decentralized-identity/ba-p/3071980.*

(Continued)

*Primary Examiner* — William L Bashore
*Assistant Examiner* — David Faber
(74) *Attorney, Agent, or Firm* — Keller Preece PLLC

(57) ABSTRACT

Systems, methods, and non-transitory computer readable media fill in digital documents using user identity models of client devices. For instance, one or more embodiments involve maintaining a user identity model that includes various details related to a client device, such as verifiable credentials and unverified claims. Upon receiving a digital document for the client device, one or more user attributes associated with the verifiable credentials and/or unverified claims are retrieved from the user identity model. Using the user attribute(s), one or more digital fillable fields of the digital document are filled.

20 Claims, 12 Drawing Sheets

(56) References Cited

U.S. PATENT DOCUMENTS

| | | | |
|---|---|---|---|
| 2005/0198563 A1* | 9/2005 | Kristjansson | G06F 40/174 715/224 |
| 2006/0212823 A1* | 9/2006 | Bhagat | G05B 19/41865 700/95 |
| 2008/0244717 A1* | 10/2008 | Jelatis | A61N 1/37254 726/5 |
| 2010/0037303 A1* | 2/2010 | Sharif | H04L 67/02 726/6 |
| 2019/0141041 A1* | 5/2019 | Bhabbur | H04L 9/3228 |
| 2019/0213336 A1* | 7/2019 | Kundu | G06F 16/683 |
| 2020/0043102 A1* | 2/2020 | Eftekhari | G06Q 40/123 |
| 2020/0403805 A1* | 12/2020 | Steele | H04L 9/3242 |
| 2021/0067340 A1* | 3/2021 | Ferenczi | H04L 9/50 |
| 2021/0243027 A1* | 8/2021 | Gupta | H04L 9/3213 |
| 2022/0122170 A1* | 4/2022 | Du | H04L 9/0869 |
| 2022/0191044 A1* | 6/2022 | Kurita | H04L 9/3263 |
| 2022/0245282 A1* | 8/2022 | Achan | G06F 21/6263 |
| 2023/0028555 A1* | 1/2023 | Cameron | G06F 21/6245 |
| 2023/0088787 A1* | 3/2023 | Omori | H04L 63/123 713/168 |
| 2023/0117628 A1* | 4/2023 | Giffard-Burley | G06F 16/93 707/736 |
| 2023/0177528 A1* | 6/2023 | Duffy | G06Q 30/0201 705/7.32 |
| 2023/0224309 A1* | 7/2023 | Puri | H04L 63/126 726/21 |
| 2023/0259918 A1* | 8/2023 | Rao | G06Q 20/4014 705/67 |
| 2023/0298015 A1* | 9/2023 | Kiraz | H04L 9/0861 |
| 2023/0351225 A1* | 11/2023 | Shalaby | G06N 5/022 |
| 2024/0031155 A1* | 1/2024 | Ferenczi | G06F 21/645 |

OTHER PUBLICATIONS

W3C, "Decentralized identifiers (dids) v1.0," Jul. 19, 2022. [Online]. Available: https://www.w3.org/TR/did-core/, 112 pages.

Microsoft, "ION," Sep. 16, 2022, Available: https://github.com/decentralized-identity/ion, 3 pages.

* cited by examiner

```
1   {
2       "agreement_id": "COPYRIGHT-LICENSE-AGREEMENT-8f1e4739d3e2880c24a759",
3       "agreement_data_fields": [
4           "licenseeName": "",
5           "licenseeState": "",
6           "licenseeEntityType": "",
7           "licenseeAddress": "",
8           "licensorName": "",
9           "licensorState": "",
10          "licensorEntityType": "",
11          "licensorAddress": "",
12      ],
13      "matadata": [
14          "agreement_creation_timestamp": "2021/08/25",
15          "agreement_expiry_timestamp": "2022/08/26",
16          ...
17          ...
18      ]
19  }
```

*Fig. 6*

FILLING DIGITAL DOCUMENTS USING MULTI-TIERED USER IDENTITY MODELS BASED ON DECENTRALIZED IDENTITY

BACKGROUND

Recent years have seen significant advancement in hardware and software platforms that provide services related to digital documents. Indeed, as the use of digital documents has become increasingly ubiquitous, systems have been developed to facilitate the creation and management of such digital documents. For instance, in the document filling field computer-implemented models can enable filling in fields of a digital document (e.g., to insert information, answer questions, or provide a signature). Despite these advancements within the document filling field, a number of technical problems exist, particularly with efficiency and security. Specifically, document filling approaches often rely on error-prone methods of inserting information into digital documents, leading to inaccurate (e.g., invalid) results.

SUMMARY

One or more embodiments described herein provide benefits and/or solve one or more of the foregoing or other problems in the art with systems, methods, and non-transitory computer-readable media that efficiently and securely fill in digital documents using a decentralized identity-based multi-tier user identity model. In particular, in one or more embodiments, the disclosed systems build a multi-tier user identity model under a decentralized identity framework. For instance, in some cases, the disclosed systems build a three-tier user identity model for a client device that includes a first tier having identifying information established under the framework, a second tier having credentials that are verifiable via the framework, and a third tier having unverified claims. The disclosed systems utilize the information of the user identity model to automatically fill digital forms accessed by the client device (e.g., without receiving manual input). In some implementations, the disclosed systems protect sensitive information by inserting arguments with valid proofs of knowledge rather than knowledge (e.g., actual data values). In this manner, the disclosed systems efficiently and securely fill in digital forms using methods that are less prone to error.

Additional features and advantages of one or more embodiments of the present disclosure are outlined in the following description.

BRIEF DESCRIPTION OF THE DRAWINGS

This disclosure will describe one or more embodiments of the invention with additional specificity and detail by referencing the accompanying figures. The following paragraphs briefly describe those figures, in which:

FIG. 6 illustrates a data representation of a digital document having a plurality of digital fillable fields in accordance with one or more embodiments;

DETAILED DESCRIPTION

Figure 1:
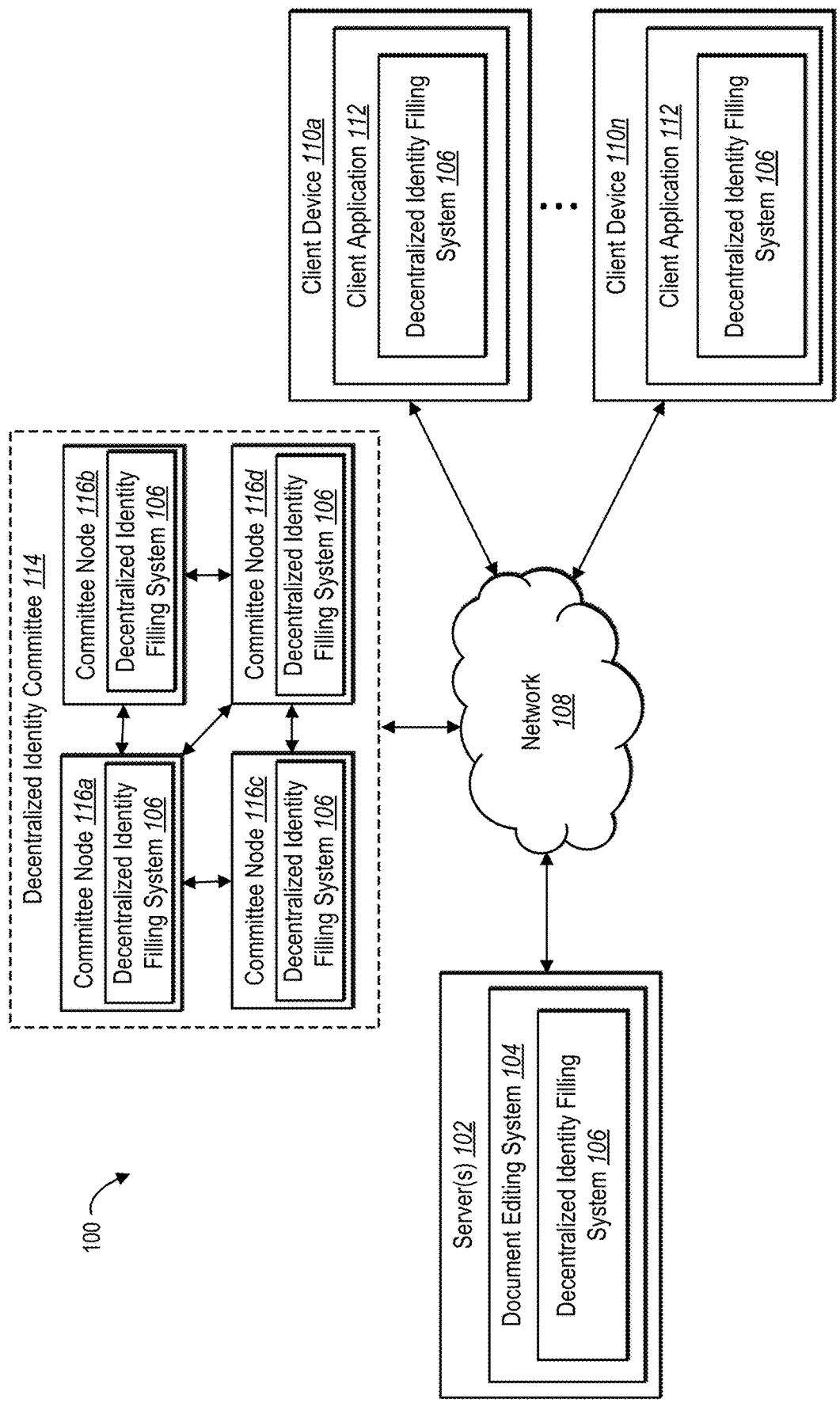
FIG. 1 illustrates an example environment in which a decentralized identity filling system operates in accordance with one or more embodiments.

One or more embodiments described herein include a decentralized identity filling system that utilizes a user identity model established under a decentralized identity framework to fill in digital documents securely and efficiently. Conventional document filling systems suffer from several technological shortcomings that result in inefficient, insecure, and inaccurate operation. For instance, conventional systems are inefficient in that they often require a significant amount of user interactions with a client device to fill in the digital fields in a digital document. Indeed, many conventional systems require manual user interactions to fill in the digital fields or to at least select the user attributes to use in filling in the digital fields. Often, a digital document includes several digital fields requesting the same user attributes (e.g., a name, address, or signature). Accordingly, conventional systems can require a multitude of repetitive user interactions to insert this information. Further, the user attributes that are added to digital documents under these conventional systems are often trustless, requiring additional steps to verify the information. For instance, these systems often require further user interactions from other client devices that are associated with the digital document to access auxiliary documents or other supporting materials that can be used to validate added user attributes.

Further, conventional document filling systems often suffer from security issues. In particular, many conventional systems leak sensitive information of one client device to other client devices associated with the same digital document unnecessarily. To illustrate, conventional systems often require a client device to fill in digital fields using user attributes directly even when the digital document (or the underlying subject matter) only requires an indication that a user attribute satisfies some threshold (e.g., by requiring an exact income amount when only an indication that a minimum income amount is needed). By requiring direct user attributes, conventional systems unnecessarily reveal sensitive personal information of user attributes to the other parties to the digital document.

In addition to problems of inefficiency and security leaks, conventional document filling systems also experience issues of inaccuracy. Indeed, as many conventional systems require user interactions to manually insert user attributes, such systems are error prone. In particular, these systems risk allowing inaccurate information to be added to a digital document. Accordingly, the resulting digital documents often do not accurately serve their purpose or reflect the subject matter that was intended.

In one or more embodiments, the decentralized identity filling system utilizes a decentralized identity framework to establish a personal three-tier user identity model that includes separate layers for identifying information, verifiable credentials, and unverified claims. In some cases, the user identity model is extensible. Further, in some embodiments, the decentralized identity filling system moves claims between layers as they become verified under the decentralized identity framework. In some implementations, the decentralized identity filling system utilizes the user identity model to fill in a digital document accessed by a client device. The user identity information added to the digital document can be verified by other associated parties. In some cases, the decentralized identity filling system utilizes arguments (rather than data values) to fill in a digital document, preventing the other associated parties from accessing those data values.

To illustrate, in one or more embodiments, the decentralized identity filling system receives a digital document comprising a digital fillable field. The decentralized identity filling system further retrieves, for a client device associated with the digital document, a decentralized identity credential comprising a user attribute established under a decentralized identity framework. Using the user attribute of the decentralized identity credential, the decentralized identity filling system modifies the digital document by filling in the digital fillable field.

As indicated above, in one or more embodiments, the decentralized identity filling system utilizes a user identity model established via a decentralized identity framework to fill in digital fields of a digital document. Indeed, in some embodiments, the decentralized identity filling system implements an identity component for establishing the user identity information and a document filling component to insert the user identity information into a digital document. In some cases, the decentralized identity filling system utilizes a modular design where various provably secure decentralized identity frameworks can be plugged in.

Indeed, as discussed above, in some embodiments, the decentralized identity filling system utilizes a decentralized identity framework to establish a user identity model for a client device (e.g., for a user of the client device). In particular, in some embodiments, the decentralized identity filling system establishes a three-tier user identity model that includes three layers corresponding to different types of user identity information. For example, in some embodiments, the first layer includes identifying information for the client device (e.g., a decentralized identifier and/or a master credential), the second layer includes credentials (e.g., context-based credentials) that are verifiable via the decentralized identity framework, and the third layer includes claims (e.g., user attributes) that have not yet been verified.

In one or more embodiments, the decentralized identity filling system establishes a verifiable credential for a client device by submitting one or more claims (e.g., user attributes) to a decentralized committee of issuers. In return, the decentralized identity filling system utilizes the decentralized committee to issue the verifiable credential. In some cases, the verifiable credential includes the signature of the decentralized committee for verification.

In some embodiments, the user identity model of the client device is extensible. In other words, in some cases, the decentralized identity filling system can add new credentials for the client device. For instance, in some cases, the decentralized identity filling system adds new credentials to support the use of the user identity model in different contexts (e.g., different application scenarios). Further, in some embodiments, the decentralized identity filling system recategorizes previously unverified claims from the third layer of the user identity model to the second layer as the claim becomes issued as part of a verifiable credential.

Further, as discussed above, in one or more embodiments, the decentralized identity filling system utilizes the user identity model of the client device to fill in one or more digital fields of a digital document accessed by the client device. In some embodiments, the decentralized identity filling system fills the digital field(s) of the digital document automatically (e.g., without user input received via the client device). For example, in some cases, the decentralized identity filling system matches (e.g., via a key-value matching algorithm) a user attribute from the user identity model to the digital field and inserts the user attribute accordingly.

In one or more embodiments, the decentralized identity filling system fills in a digital field with a privacy-preserving argument rather than inserting the user attribute directly. For instance, in some cases, the decentralized identity filling system determines that the user attribute of a client device comprises sensitive personal information (e.g., exact age or income). The decentralized identity filling system further generates a privacy-preserving argument that indicates the sensitive personal information satisfies a threshold that corresponds to a digital field (e.g., a minimum age or a minimum income). Thus, the decentralized identity filling system provides a zero-knowledge proof of the user attribute, preventing other client devices associated with a digital document from accessing the user attribute.

In some implementations, the decentralized identity filling system verifies user attributes (or corresponding privacy-preserving arguments) of a client device that have been inserted into the digital document. For instance, in embodiments, the decentralized identity filling system utilizes the signature of the decentralized committee of issuers to verify the credential associated with the inserted user attributes. In some cases, upon verifying the user attributes, the decentralized identity filling system provides an indication of verification to the client device (and/or other client devices associated with the digital document).

In one or more embodiments, the decentralized identity filling system utilizes a graphical user interface that facilitates filling in digital fields of a digital document and verification of the inserted user attributes. To illustrate, in some cases, the decentralized identity filling system provides the digital document for display within a graphical user interface of a client device as well as user attributes that have been inserted into the digital fields. In some cases, the decentralized identity filling system further provides a verification indication for display in association with inserted user attributes that have been verified. In some instances, in response to a user interaction corresponding to a user attribute, the decentralized identity filling system removes its verification indication and enables modification of the user attribute. Additionally, in some implementations, the decentralized identity filling system utilizes the graphical user interface to facilitate the entry of user identity information that is unassociated with the user identity model.

The decentralized identity filling system provides several advantages over conventional systems. For example, the decentralized identity filling system improves the efficiency of implementing computing devices when compared to conventional systems. To illustrate, the decentralized identity filling system reduces the interactive steps required to fill the digital fields of a digital document. Indeed, by filling in the digital fields using corresponding user attributes of a user identity model, the decentralized identity filling system reduces the user interactions typically required to manually fill the digital fields under conventional systems. Further, by utilizing user attributes established under a decentralized identity framework, the decentralized identity filling system reduces the user interactions typically required for verifying such user attributes. Indeed, user attributes established under a decentralized identity framework are trusted in the sense that they can be publicly verified under the framework (e.g., using the signature of the decentralized committee of issuers), thus enhancing the overall security of the system. Accordingly, the decentralized identity filling system enables a more efficient filing system by reducing the user interactions often required to access and process supporting materials as part of the verification.

Additionally, the decentralized identity filling system improves the security of implementing computing devices when compared to conventional systems. In particular, by filling in digital fields using privacy-preserving arguments that prevent access to the corresponding user attributes of a client device, the decentralized identity filling system protects sensitive information of the client device from unnecessarily leaking to other client devices associated with the digital document. As many of the user attributes are verifiable via the decentralized identity framework, the decentralized identity filling system provides a zero-knowledge proof that indicates the validity of such user attributes without revealing them directly.

Further, the decentralized identity filling system improves the accuracy of implementing computing devices when compared to conventional systems. In particular, by filling in digital fields of a digital document using user attributes stored within a user identity model and without manual user input, the decentralized identity filling system reduces the errors associate with manual user interactions. Accordingly, the digital documents produced by the decentralized identity filling system reflect their intended subject matter more accurately.

Additional details regarding the decentralized identity filling system will now be provided with reference to the figures. For example, FIG. 1 illustrates a schematic diagram of an exemplary system environment ("environment") 100 in which a decentralized identity filling system 106 operates. As illustrated in FIG. 1, the environment 100 includes a server(s) 102, a network 108, client devices 110a-110n, and a decentralized identity committee 114.

Although the environment 100 of FIG. 1 is depicted as having a particular number of components, the environment 100 is capable of having any number of additional or alternative components (e.g., any number of servers, client devices, committee nodes, or other components in communication with the decentralized identity filling system 106 via the network 108). Similarly, although FIG. 1 illustrates a particular arrangement of the server(s) 102, the network 108, the client devices 110a-110n, and the decentralized identity committee 114, various additional arrangements are possible.

The server(s) 102, the network 108, the client devices 110a-110n, and the decentralized identity committee 114 (e.g., the committee nodes 116a-116d of the decentralized identity committee 114) are communicatively coupled with each other either directly or indirectly (e.g., through the network 108 discussed in greater detail below in relation to FIG. 11). Moreover, the server(s) 102, the client devices 110a-110n, and the committee nodes 116a-116d of the decentralized identity committee 114 include one of a variety of computing devices (including one or more computing devices as discussed in greater detail with relation to FIG. 11).

As mentioned above, the environment 100 includes the server(s) 102. In one or more embodiments, the server(s) 102 generates, stores, receives, and/or transmits data including digital documents and modified digital documents (e.g., digital documents with digital fields that have been filled in). In one or more embodiments, the server(s) 102 comprises a data server. In some implementations, the server(s) 102 comprises a communication server or a web-hosting server.

In one or more embodiments, the document editing system 104 provides functionality by which a client device (e.g., a user of one of the client devices 110a-110n) accesses, generates, edits, manages, and/or stores digital documents. For example, in some instances, a client device accesses, via the network 108, a digital document provided by the document editing system 104 hosted on the server(s) 102. The document editing system 104 then provides options that the client device may use to edit the digital document, store the digital document, and subsequently search for, access, and view the digital document. For instance, in some cases, the document editing system 104 provides one or more options that the client device may use to edit the contents of the digital fields of a digital document.

Additionally, the server(s) 102 include the decentralized identity filling system 106. In one or more embodiments, via the server(s) 102, the decentralized identity filling system 106 modifies a digital document accessed by a client device (e.g., one of the client devices 110a-110n) by filling in one or more of its digital fields. To illustrate, in some cases, the decentralized identity filling system 106, via the server(s) 102, receives or otherwise accesses a digital document that includes a digital field. Via the server(s) 102, the decentralized identity filling system 106 further retrieves a decentralized identity credential for the client device, where the decentralized identity credential includes a user attribute established under a decentralized identity framework (e.g., via the decentralized identity committee 114). The decentralized identity filling system 106, via the server(s) 102, modifies the digital document by filling in the digital field using the user attribute. Example components of the decentralized identity filling system 106 will be described below with regard to FIG. 9.

In one or more embodiments, the decentralized identity committee 114 issues decentralized identity credentials for client devices. As shown in FIG. 1, the decentralized identity committee 114 includes committee nodes 116a-116d that operate jointly to issue a decentralized identity credential for a client device. In some cases, each of the committee nodes 116a-116d correspond to distinct entities. In some instances, the number of committee nodes participating in the decentralized identity committee 114 is based on a concrete security assumption. In some cases, the committee nodes 116a-116d of the decentralized identity committee 114 provide a signature with the decentralized identity credential so that it can be subsequently verified. In some cases, the decentralized identity committee 114 communicates with the server(s) 102 or directly with a client device to issue a decentralized identity credential for that client device.

In one or more embodiments, the client devices 110a-110n include computing devices that can access, edit, modify, store, and/or provide, for display, digital documents and/or manage a user identity model that includes decentralized identity credentials. For example, the client devices 110a-110n include smartphones, tablets, desktop computers, laptop computers, head-mounted-display devices, or other electronic devices. The client devices 110a-110n include one or more applications (e.g., the client application 112) that can access, edit, modify, store, and/or provide, for display, digital documents and/or manage a user identity model that includes decentralized identity credentials. For example, in some embodiments, the client application 112 includes a software application installed on the client devices 110a-110n. In other cases, however, the client application 112 includes a web browser or other application that accesses a software application hosted on the server(s) 102.

The decentralized identity filling system 106 can be implemented in whole, or in part, by the individual elements of the environment 100. Indeed, as shown in FIG. 1 the decentralized identity filling system 106 can be implemented with regard to the server(s) 102, at the client devices 110a-110n, and/or at the committee nodes 116a-116d of the decentralized identity committee 114. In particular embodiments, the decentralized identity filling system 106 on the client devices 110a-110n comprises a web application, a native application installed on the client devices 110a-110n (e.g., a mobile application, a desktop application, a plug-in application, etc.), or a cloud-based application where part of the functionality is performed by the server(s) 102.

In additional or alternative embodiments, the decentralized identity filling system 106 on the client devices 110a-110n represents and/or provides the same or similar functionality as described herein in connection with the decentralized identity filling system 106 on the server(s) 102. In some implementations, the decentralized identity filling system 106 on the server(s) 102 supports the decentralized identity filling system 106 on the client devices 110a-110n.

For example, in some embodiments, the decentralized identity filling system 106 on the server(s) 102 communicates with the decentralized identity committee 114 to obtain decentralized identity credentials for the client devices 110a-110n. The decentralized identity filling system 106 on the server(s) 102 provides the decentralized identity credentials to the decentralized identity filling system 106 on the client devices 110a-110n. In particular, the decentralized identity filling system 106 on the server(s) 102 provides the decentralized identity credentials for a given client device to the decentralized identity filling system 106 operating on that client device. Accordingly, although not illustrated, in one or more embodiments the client devices 110a-110n utilize their corresponding decentralized identity credentials to fill in the digital fields of a digital document. In some cases, the decentralized identity filling system 106 on the server(s) 102 maintains the decentralized identity credentials of a client device and provides the client device access to its decentralized identity credentials when modifying a digital document.

In some embodiments, the decentralized identity filling system 106 includes a web hosting application that allows the client devices 110a-110n to interact with content and services hosted on the server(s) 102 and/or hosted by the decentralized identity committee 114. To illustrate, in one or more implementations, the client devices 110a-110n accesses a web page or computing application supported by the server(s) 102. The client devices 110a-110n provide input to the server(s) 102 (e.g., decentralized identity credentials). In response, the decentralized identity filling system 106 on the server(s) 102 utilizes the user attributes of the decentralized identity credentials to fill in the digital fields of a digital document. The server(s) 102 then provides the modified digital document to the client devices 110a-110n.

In some embodiments, though not illustrated in FIG. 1, the environment 100 has a different arrangement of components and/or has a different number or set of components altogether. For example, in certain embodiments, the client devices 110a-110n communicate directly with the server(s) 102 or the decentralized identity committee 114, bypassing the network 108. As another example, the environment 100 includes a third-party server comprising a content server and/or a data collection server.

Figure 2:
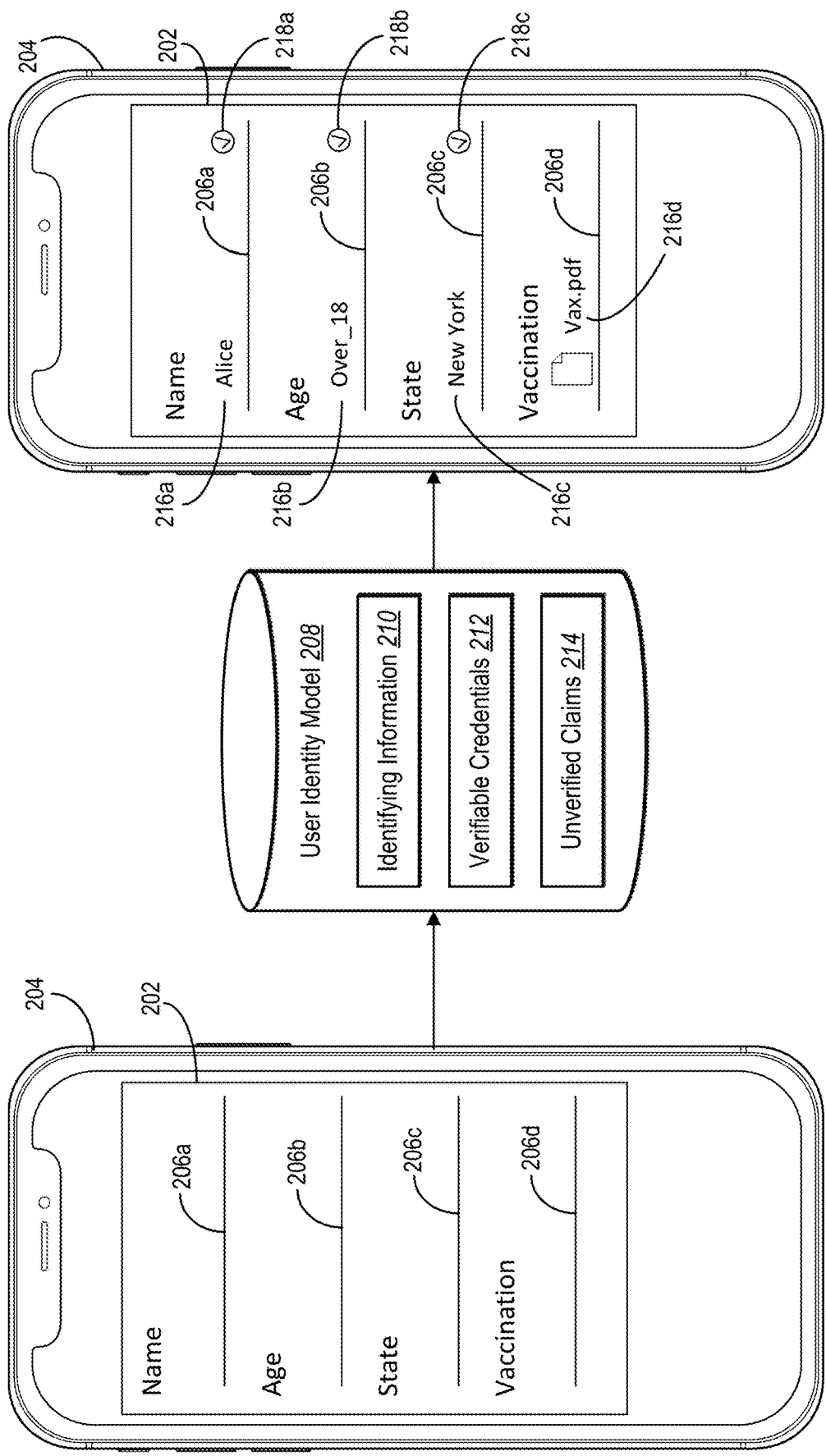
FIG. 2 illustrates an overview diagram of the decentralized identity filling system filling in digital fields of a digital document using user attributes of a client device in accordance with one or more embodiments.

As mentioned above, the decentralized identity filling system 106 modifies a digital document associated with a client device by filling in digital fields using user attributes of the client device. FIG. 2 illustrates an overview diagram of the decentralized identity filling system 106 filling in digital fields of a digital document using user attributes of a client device in accordance with one or more embodiments.

As shown in FIG. 2, the decentralized identity filling system 106 receives or otherwise accesses a digital document 202 via a client device 204. For instance, in some cases, the decentralized identity filling system 106 generates the digital document 202 at the client device 204, receives the digital document 202 from another client device or server, or accesses the digital document 202 via a database that manages digital documents. To illustrate, in some cases, the digital document 202 is associated with multiple client devices. In other words, multiple client devices are party to the subject matter of the digital document 202 (e.g., are required fill out the digital document 202). Accordingly, in some cases, one of the client devices creates and/or manages the digital document 202 and provides accesses to the other client device(s) (e.g., by transmitting the digital document 202 to the other client device(s) directly or via a server and/or by storing the digital document 202 at a database accessible to the other client device(s)).

As further shown in FIG. 2, the digital document 202 includes a plurality of digital fillable fields 206a-206d. In one or more embodiments, a digital fillable field includes a portion of a digital document that is designated for input. In particular, in some embodiments, a digital fillable field includes a portion of a digital document with which a client device interacts to provide input, such as by inserting one or more user attributes of the client device. To illustrate, in some cases, a digital fillable field includes, but is not limited to, a drop-down menu, one or more selectable boxes (e.g., check boxes) or buttons, or a portion of a digital document designated for input of a free text response, a link, an image, or an attachment.

Additionally, as shown in FIG. 2, the decentralized identity filling system 106 utilizes a user identity model 208 of the client device 204 to modify the digital document 202. In one or more embodiments, a user identity model includes a data structure for storing and/or managing user identity information. In particular, in some embodiments, a user identity model corresponds to a particular client device (e.g., a user of the client device) and stores user identity information associated with the client device. In implementations, a user identity model stores various types of user identity information associated with the corresponding client device (e.g., identifying information, user attributes, etc.). In one or more embodiments, a user identity model includes a multi-tier user identity model having separate layers for different types of user identity information.

Indeed, as shown in FIG. 2, the user identity model 208 includes a three-tier user identity model with three separate layers (e.g., tiers) for storing different types of user identity information. For instance, as illustrated, the user identity model 208 includes a first layer 210 that stores identifying information of the client device 204. In one or more embodiments, identifying information includes user identity information that uniquely identifies the client device 204 (e.g., the user) corresponding to the user identity model 208. For instance, in some cases, identifying information includes a decentralized identifier, a public key, or an identifying user attribute that has been verified (e.g., a name). In some instances, identifying information also includes metadata associated with the client device 204 (e.g., a date the user identity model 208 was established or the date the client device 204 last accessed the user identity model 208). Further, in some cases, identify information includes a master credential that corresponds to (e.g., is unique to) the client device 204.

As further shown in FIG. 2, the user identity model 208 includes a second layer 212 that stores verifiable credentials of the client device 204. Generally, in one or more embodiments, a decentralized identity credential includes a set of one or more claims established via a decentralized identity framework (claims—discussed in more detail below—include user attributes used that can be added to digital documents). In particular, in some embodiments, a decentralized identity credential includes a set of one or more claims issued by a decentralized issuer. In some cases, a decentralized identity credential includes other user identity information, such as a cryptographic key of the client device 204 and/or a validity proof (e.g., a signature of the decentralized issuer). In some implementations, a decentralized identity credential includes a master credential or a context-based credential. Further, in some instances, a decentralized identity credential is a verifiable credential (as shown in FIG. 2). In one or more embodiments, a verifiable credential includes a decentralized identity credential that is verifiable via a decentralized identity framework. In particular, in some embodiments, a verifiable credential includes a decentralized identity credential that has been issued by a decentralized identity framework and can be verified via the decentralized identity framework. For instance, as will be discussed more below, the decentralized identity filling system 106 verifies a decentralized identity credential using the included signature from the decentralized issuer in some implementations. It should be noted that the following generally discusses verifiable credentials in the form of context-based credentials, though a master credential can be verifiable in some instances.

Additionally, as illustrated in FIG. 2, the user identity model 208 includes a third layer 214 that stores unverified claims of the client device 204. In one or more embodiments, a claim includes a statement regarding the client device 204 (e.g., the user of the client device). In particular, in some embodiments, a claim includes a set of data that provides some knowledge of the client device 204. For instance, in some cases, a claim includes an attribute type (e.g., name, age, or state) and a user attribute (e.g., a value of the attribute type that corresponds to the client device 204, such as a name, age, or state that corresponds to the client device 204). In some cases, a claim includes additional information, such as a provider of the user attribute.

In one or embodiments, an unverified claim includes a claim that has not been verified via a decentralized identity framework. For instance, in some cases, an unverified claim includes a claim that is not part of a decentralized identity credential that has been issued via a decentralized identity framework. Accordingly, an unverified user attribute includes a user attribute that is part of an unverified claim or that has otherwise yet to be verified via a decentralized identity framework. For instance, in some cases, an unverified user attribute includes a user attribute that has previously been used to fill in a digital fillable field of a digital document but has yet to be submitted to a decentralized issuer for issuance as part of a decentralized identity credential. In some cases, an unverified claim includes a claim for which verification is unlikely. For instance, in some cases, an unverified claim includes a claim for which no ground truth exists (e.g., a claim corresponding to a personal preference or hobby).

As discussed above, in one or more embodiments, the decentralized identity filling system 106 establishes the user identity model 208 (e.g., establishes decentralized identity credentials of the user identity model 208) via a decentralized identity framework. In one or more embodiments, a decentralized identity framework includes a framework for establishing decentralized identity information of client devices (e.g., of users of the client devices). In particular, in some embodiments, a decentralized identity framework includes one or more models, processes, and/or devices for establishing decentralized identity information of client devices.

For example, in one or more embodiments, a decentralized identity framework includes a decentralized issuer that issues decentralized identity credentials for client devices. In some cases, a decentralized issuer includes one or more models, processes, and/or devices that issues decentralized identity credentials for client devices. In particular, in some embodiments, a decentralized issuer includes a decentralized identity committee that operates to issue decentralized identity credentials for client devices More detail regarding establishing a user identity model under a decentralized identity framework will be discussed below with regard to FIG. 3.

As illustrated in FIG. 2, the decentralized identity filling system 106 modifies the digital document 202 by filling in the digital fillable fields 206a-206d. In particular, the decentralized identity filling system 106 fills in the digital fillable fields 206a-206d using user attributes 216a-216d retrieved from the user identity model 208. As mentioned, in one or more embodiments, a user attributes includes a value that corresponds with an attribute type. In particular, in some embodiments, a user attribute includes a particular piece of information of a client device (e.g., of a user of a client device). In some cases, a user attribute includes a set of alphanumeric or other characters (e.g., text) that includes the information (e.g., the user attribute 216a or the user attribute 216c) In some instances, a user attribute includes a digital document (e.g., the user attribute 216d), a digital image, audio, or a digital video that includes the information (and is attached to or embedded within the digital document 202). Further, in some instances, a user attribute includes a selection from among a plurality of selectable options. In other words, rather than inserting information that represents the user attribute, the decentralized identity filling system 106 makes a selection from various options provided by the digital document 202.

In some implementations, as shown in FIG. 2, a user attribute includes a privacy-preserving argument (e.g., the user attribute 216b). In one or more embodiments, a privacy-preserving argument includes an indication that corresponding information satisfies a threshold. In particular, in some embodiments, a privacy-preserving argument includes a logical argument regarding the corresponding information. For instance, in some cases, a privacy-preserving argument includes a logical argument that the corresponding information satisfies a minimum threshold (e.g., is equal to or greater than the minimum threshold) or a maximum threshold (e.g., is equal to or less than the maximum threshold).

To illustrate, in some cases, the decentralized identity filling system 106 generates a privacy-preserving argument from a corresponding user attribute that includes a precise data value (e.g., a precise age or income). In some implementations, the decentralized identity filling system 106 stores the privacy-preserving argument rather than the corresponding user attribute. In some cases, the decentralized identity filling system 106 stores the privacy-preserving argument in addition to the corresponding user attribute. In some cases, the decentralized identity filling system 106 stores the corresponding user attribute and generates the corresponding privacy-preserving argument when needed to fill in a digital fillable field.

In some implementations, the decentralized identity filling system 106 determines to utilize a privacy-preserving argument upon determining that the corresponding user attribute includes sensitive personal information. In some cases, the decentralized identity filling system 106 defines (e.g., via established parameters) which user attributes include sensitive personal information. In some embodiments, however, the user attributes that include sensitive personal information are designated by the client device of the user identity model in which the user attributes are stored.

In one or more embodiments, upon determining that a user attribute includes sensitive personal information, the decentralized identity filling system 106 generates the corresponding privacy-preserving argument (e.g., at the time of filling in a digital fillable field or when the user attribute is added to the user identity model). Further, the decentralized identity filling system 106 utilizes the privacy-preserving argument to fill in a digital fillable field of a digital document rather than the corresponding user attribute having the precise data value.

By utilizing privacy-preserving arguments rather than user attributes having precise data values, the decentralized identity filling system 106 improves upon the security offered by conventional document filling systems. Indeed, where even sensitive personal information is visible to other parties of a digital document under conventional systems, the decentralized identity filling system 106 prevents this information from exposure.

As further illustrated in FIG. 2, the decentralized identity filling system 106 provides verification indications 218a-218c for display by the client device 204. In one or more embodiments, a verification indication includes an indication that a user attribute (or its corresponding decentralized identity credential) has been verified. In particular, in some embodiments, a verification indication indicates that a user attribute has been verified by a decentralized identity framework, such as the decentralized identity framework that issued the user attribute (e.g., issued the decentralized identity credential). For instance, in some cases, as shown in FIG. 2, a verification indication includes a graphical element that is display in association with a user attribute to indicate that the user attribute has been verified.

In some embodiments, the decentralized identity filling system 106 provides verification indications for user attributes that are a part of a verifiable credential. For instance, the verification indications 218a-218c indicate that the user attributes 216a-216c are part of a verifiable credential from the second layer 212 of the user identity model 208. Accordingly, the lack of a verification indication for the user attribute 216d can indicate that the user attribute 216d is part of an unverified claim from the third layer 214 of the user identity model 208.

As indicated by the verification indication 218b, the privacy-preserving argument (e.g., the user attribute 216b) is verifiable. Accordingly, the decentralized identity filling system 106 provides a zero-knowledge proof that the underlying sensitive information is valid. Thus, the decentralized identity filling system 106 protects sensitive personal information while also proving its validity.

Figure 3:
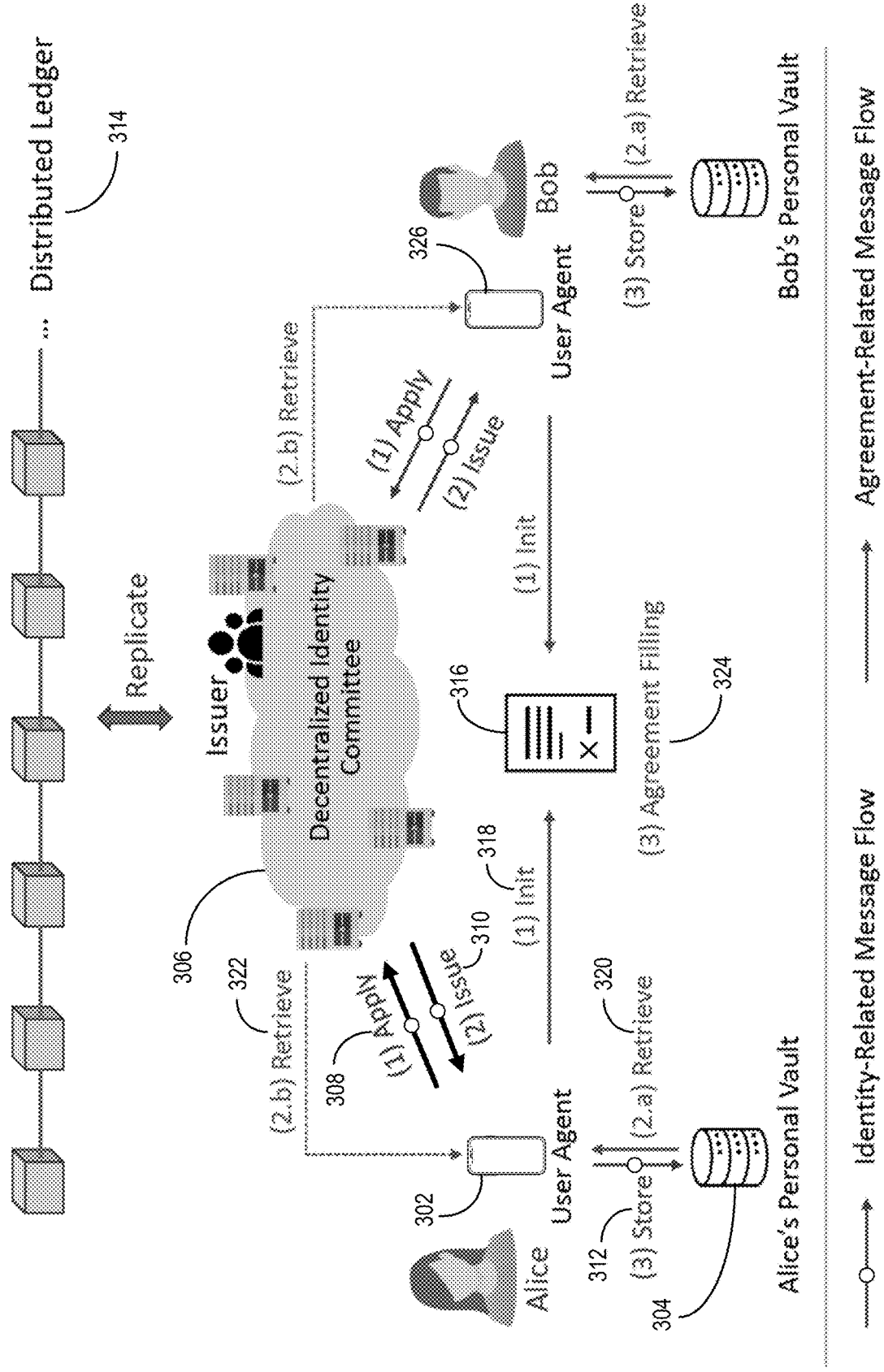
FIG. 3 illustrates a diagram of a framework implemented by the decentralized identity filling system for establishing and utilizing user identity information to fill in digital fillable fields of digital documents in accordance with one or more embodiments.

FIG. 3 illustrates a diagram of a framework implemented by the decentralized identity filling system 106 for establishing and utilizing user identity information to fill in digital fillable fields of digital documents in accordance with one or more embodiments. In particular, FIG. 3 illustrates a framework that includes an identity component (e.g., a decentralized identity component) for establishing the user identity information and a document filling component to insert the user identity information into a digital document. As previously mentioned, in some cases, the decentralized identity filling system 106 implements a modular design where various provably secure decentralized identity frameworks can be plugged in. Accordingly, the decentralized identity framework discussed below is exemplary.

As shown in FIG. 3, the decentralized identity filling system 106 establishes user identity information for a client device 302. As further shown, in some instances, the decentralized identity filling system 106 stores and maintains the user identity information of the client device 302 within a user identity model using a personal storage vault 304 associated with the client device 302. Accordingly, the decentralized identity filling system 106 can operate on the client device 302 as a self-sovereign, controlling and managing (e.g., revoking) its associated user identity information instead of relying on a third party.

In one or more embodiments, the decentralized identity filling system 106 establishes the user identity information for the client device 302 by generating a decentralized identifier (DID) for the client device 302. In one or more embodiments, a decentralized identifier includes a unique identifier that is established under a decentralized identity framework. In particular, in some embodiments, a decentralized identifier includes an identifier that uniquely identifies a client device with respect to a corresponding decentralized identity framework. To illustrate, in one or more embodiments, the decentralized identity filling system 106 generates a decentralized identifier in the following form:

$$\text{did:DID\_Method:123456789abcdefghi} \qquad (1)$$

In the form for the decentralized identifier shown above, the segment did is a fixed prefix and DID_Method specifies a concrete decentralized identity framework. Further, the string 123456789abcdefghi represents the DID method-specific identifier of the client device 302.

In one or more embodiments, the decentralized identity filling system 106 further generates one or more cryptographic keys for the client device 302. For instance, in some implementations, the decentralized identity filling system 106 generates a public/private key pair ($pk^u$, $sk^u$) for the client device 302 (where u denotes the client device 302, $pk^u$ represents the public key and $sk^u$ represents the private, or secret, key). In one or more embodiments, the decentralized identity filling system 106 utilizes the public key and the decentralized identifier interchangeably to identify the client device 302.

In some cases, the decentralized identity filling system 106 stores a mapping relationship between the public key and the decentralized identifier of the client device 302. For instance, in some embodiments, the decentralized identity filling system 106 utilizes a public key infrastructure (PKI) to store the mapping. For instance, in at least one implementation, the decentralized identity filling system 106 utilizes, to store the mapping, the PKI-like infrastructure described by Microsoft, *ION,* 2021, https://github.com/decentralized-identity/ion, which is incorporated herein by reference in its entirety.

In one or more embodiments, the decentralized identity filling system 106 establishes the user identity information for the client device 302 by further establishing a decentralized identity credential for the client device 302. In one or more embodiments, the decentralized identity filling system 106 utilizes decentralized identity credentials that have the following general form:

$$\text{cred}=\{pk^u, ctx, \{claim_i\}, \sigma\}, claim_i=\{a_i, v_i, P_i\} \quad (2)$$

In the form for the decentralized identity credential shown above, ctx represents the context in which the decentralized identity credential will be used and σ represents the signature of the decentralized issuer over $pk^u$, ctx, and the set of claims represented by $\{claim_i\}$. Additionally, for the claim form, $a_i$ represents the attribute type and $v_i$ represents the user attribute providing a value for the attribute type. In some instances, where the user attribute includes sensitive personal information, the decentralized identity filling system 106 utilizes $comm(v_i)$, where comm(•) represents a cryptographic commitment scheme. For instance, in at least one implementation, the decentralized identity filling system 106 utilizes a cryptographic commitment scheme described by R. Canetti and M. Fischlin, *Universally Composable Commitments,* Annual International Cryptology Conference, Springer, 2001, pp. 19-40, which is incorporated herein by reference in its entirety.

Further, for the claim form shown above, $P_i$ provides the provider of the claim. As one example, where the attribute type includes a social security number, $P_i$ can include the name, address, or website of the government entity that provides social security numbers.

In some implementations, the decentralized identity filling system 106 establishes a master credential for the client device 302. In one or more embodiments, a master credential includes a decentralized identity credential used for creating or issuing one or more other decentralized identity credentials. For instance, in some embodiments, a master credential includes a decentralized identity credential used for creating or issuing context-based credentials. In some implementations, a master credential uniquely identifies the corresponding client device. For instance, in some cases, master credential includes or is associated with a cryptographic key (e.g., a public key) that uniquely corresponds to a client device.

As shown in FIG. 3, the decentralized identity filling system 106 establishes the master credential for the client device 302 via a decentralized issuer (i.e., the decentralized identity committee 306). For instance, in one or more embodiments the decentralized identity filling system 106 utilizes an oracle protocol for the client device 302 to generate a (zero-knowledge) proof π indicating that claim 1 originates from the provider $P_i$. For instance, in some instances, the decentralized identity filling system 106 utilizes the protocol described by F. Zhang et al., *Town Crier: An Authenticated Data Feed for Smart Contracts,* Proceedings of the 2016 ACM SIGSAC Conference on Computer and Communications Security, 2016, pp. 270-282 or the protocol described by F. Zhang et a., Deco: *Liberating Web Data Using Decentralized Oracles for TLS,* Proceedings of the 2020 ACM SIGSAC Conference on Computer and Communications Security, 2020, pp. 1919-1938, both of which are incorporated herein by reference in their entirety.

In some instances, the decentralized identity filling system 106 submits the request for the master credential (along with the generated proof) to the decentralized identity committee 306 (as shown by the line 308) (the decentralized committee is equipped with the cryptographic keys ($pk^C$, $sk^C$)). Via the decentralized identity committee 306, the decentralized identity filling system 106 issues the master credential to the client device 302 (as shown by the line 310). For instance, in some embodiments, the decentralized identity filling system 106 operating on the committee nodes of the decentralized identity committee 306 utilizes a secure multi-party computation (MPC) protocol to determine whether the client device 302 has applied for a master credential before. In some implementations, the decentralized identity filling system 106 utilizes the protocol described by M. Keller, *MP-SPDZ: A Versatile Framework for Multi-party Computation,* Proceedings of the 2020 ACM SIGSAC Conference on Computer and Communications Security, 2020, pp. 1575-1590, which is incorporated herein by reference in its entirety.

In one or more embodiments, upon determining that the client device 302 has not previously applied for a master credential, the decentralized identity filling system 106 utilizes the decentralized identity committee 306 to issue the master credential. In some embodiments, the decentralized identity filling system 106 issues a master credential having the following form:

$$\text{cred}_{master}=\{pk^u, \text{"master"}, \{claim_i\}, \{\text{"dedupOver"}, \{a\}\}, \sigma^C\} \quad (3)$$

In the master credential form shown above, the string "master" specifies that the decentralized identity credential is a master credential and $\{claim_i\}$ represents the set of claims submitted to and verified by the decentralized identity committee 306. Additionally, {"dedupOver", {a}} represents that the master credential is unique to the client device 302 due to the attribute a (e.g., some unique user attribute associated with the client device 302, such as a social security number). Further, $\sigma^C$ represents the signature of the decentralized identity committee 306.

Similarly, in some implementations, the decentralized identity filling system 106 establishes a context-based credential for the client device 302. In one or more embodiments, a context-based credential includes a decentralized identity credential that corresponds to a particular context. For instance, in some cases, a context-based credential includes one or more claims that can be used in a corresponding context. Indeed, in one or more embodiments, the decentralized identity filling system 106 utilizes context-based credentials, rather than a master credential, for performing tasks. For instance, in some embodiments, the decentralized identity filling system 106 utilizes context-based credentials to allow for unlinkability across different application scenarios (e.g., where each application scenario corresponds to a different context for filling in a digital document). Accordingly, the decentralized identity filling system 106 can utilize the context-based credentials to prevent third-parties from tracking the activity of the client device 302. In some cases, where the context is unknown beforehand, the decentralized identity filling system 106 specifies the context as "common usage."

In one or more embodiments, the decentralized identity filling system 106 establishes a context-based credential for the client device 302 by—similar to establishing the master credential—submitting a request to the decentralized identity committee 306 (as represented by the line 308). In some embodiments, the decentralized identity filling system 106 submits the master credential of the client device 302 as part of the request. In some cases, the decentralized identity filling system 106 further submits a cryptographic key of the client device 302. For instance, in some implementations, the decentralized identity filling system 106 generates and submits a new public key $pk_{ctx}^u$. Additionally, in some implementations, the decentralized identity filling system 106 submits one or more claims to be included as part of the context-based credential.

Further, similar to issuing the master credential, the decentralized identity filling system 106 utilizes the decentralized identity committee 306 to issue the context-based credential to the client device 302 (as shown by the line 310). In particular, the decentralized identity filling system 106 utilizes the decentralized identity committee 306 to verify the claims submitted as part of the request and issue the context-based credential accordingly. In some cases, the decentralized identity filling system 106 utilizes the decentralized identity committee 306 to issue a context-based credential having the following form:

$$\text{cred}_{context} = \{pk_{ctx}^u, \text{"context"}, \{\text{claim}_i\}, \{\text{"dedupOver"}, \{a\}\}, \text{ctx}, \sigma^C\} \quad (4)$$

In the context-based credential form above, the string "context" specifies that the decentralized identity credential is a context-based credential and ctx represents the corresponding context. In one or more embodiments, in addition to issuing the context-based credential, the decentralized identity filling system 106 utilizes the decentralized identity committee 306 to create a mapping ($pk^u$, $pk_{ctx}^u$) between the public key and new public key of the client device 302. In some cases, the decentralized identity filling system 106 utilizes the decentralized identity committee 306 to store the mapping in a jointly maintained table Issued$_{ctx}$.

In one or more embodiments, the decentralized identity filling system 106 determines whether the decentralized identity credentials (e.g., the master credential and context-based credentials) issued to the client device 302 are valid. For instance, in some cases the decentralized identity filling system 106 determines if a decentralized identity credential is valid if (i) the signature $\sigma^C$ is valid, indicating the decentralized identity committee 306 provided the signature, (ii) the cryptographic key (e.g., public key) associated with the decentralized identity credential is not included in a public revocation list, and (iii) relevant cryptographic commitment openings (for sensitive personal information) are valid. More detail regarding verification of a decentralized identity credential or a corresponding user attribute will be provided below.

As further shown in FIG. 3, the decentralized identity filling system 106 stores the decentralized identity credentials (e.g., the master credential and context-based credentials) issued to the client device 302 within the personal storage vault 304 of the client device 302 (as shown by the line 312). In particular, the decentralized identity filling system 106 stores the master credential and context-based credentials (along with other user identity information) within a user identity model maintained at the personal storage vault 304. Accordingly, the decentralized identity filling system 106 allows issued decentralized identity credentials to be locally-cached to promote self-sovereignty and facilitate efficient retrieval.

Further, in one or more embodiments, the decentralized identity filling system 106 stores the master credential and context-based credentials issued to the client device 302 within a distributed digital ledger 314. Indeed, in some embodiments, the decentralized identity filling system 106 replicates the user identity model of the client device 302 within the distributed digital ledger 314. In some embodiments, the decentralized identity filling system 106 stores the user identity information of the client device 302 as secret shares among committee nodes of the decentralized identity committee 306 and replicates the secret shares to a permissioned distributed digital ledger 314 for more robust storage.

As further shown in FIG. 3, the decentralized identity filling system 106 utilizes decentralized identity credentials (e.g., context-based credentials) issued to the client device 302 to fill in a digital document 316. For instance, as shown in FIG. 3, the decentralized identity filling system 106 accesses, via the client device 302, the digital document 316 to initiate the filling process (as shown by the line 318). Additionally, the decentralized identity filling system 106 retrieves one or more relevant decentralized identity credentials for the client device 302. For instance, as shown in FIG. 3, the decentralized identity filling system 106 retrieves the decentralized identity credential(s) from the personal storage vault 304 of the client device 302 in some cases (as shown by the line 320). In some implementations, the decentralized identity filling system 106 retrieves the decentralized identity credential(s) from the distributed digital ledger 314 maintained by the decentralized identity committee 306 (as shown by the line 322). Using the retrieved decentralized identity credential(s), the decentralized identity filling system 106 modifies the digital document 316 by filling in its digital fillable fields with corresponding user attributes (as shown by step 324).

As shown in FIG. 3, the decentralized identity filling system 106 similarly establishes and utilizes decentralized identity credentials for a second client device 326. In some cases, the second client device 326 is also associated with the digital document 316. In other words, the second client device 326 is a party to the subject matter represented in the digital document 316. Accordingly, the decentralized identity filling system 106 can utilize issued decentralized identity credentials to fill in a digital document for multiple parties to improve the efficiency of the filling process.

Indeed, by filling in a digital document as described above, the decentralized identity filling system 106 operates with improved efficiency when compared to conventional systems. In particular, as previously mentioned, the decentralized identity filling system 106 can modify a digital document by filling in its fillable digital fields upon access to the digital document and without user input. Accordingly, the decentralized identity filling system 106 reduces the user interactions that are required under many conventional systems to manually and repeatedly fill in a digital document. This further improves the accuracy of the resulting digital document as reduction of manual input leads to a reduction in error due to manual input. Thus, the results more accurately reflect the intended subject matter.

In some cases, the decentralized identity filling system 106 further provides improved security when compared to conventional systems. For instance, as discussed above, the decentralized identity filling system 106 utilizes privacy-preserving arguments in some instances to protect the exposure of sensitive information even from other parties to the digital document. In some implementations, the decentralized identity filling system 106 also implements access control to the user attributes added to digital documents.

For instance, in one or more embodiments, the decentralized identity filling system 106 restricts access to user attributes. For example, in some embodiments, the decentralized identity filling system 106 restricts access to user attributes associated with one party to a digital document so that only certified representatives or non-human entities of another party to the digital document can view the user attributes. In some cases, the decentralized identity filling system 106 restricts access so that a party to a digital document can view only those user attributes needed to perform some function (such as by restricting access so that a merchant that is a party to a digital document can only view the city and/or state of the buyer that is the other party of the digital document for calculating shipping costs or taxes). In some cases, the decentralized identity filling system 106 implements such restrictions using zero-knowledge proofs so that the party to which the restrictions are applied are aware that the user attributes are valid without being able to view them.

Additionally, in some instances, the decentralized identity filling system 106 provides improved security by revoking access to user attributes automatically or upon request. To illustrate, in some implementations, the decentralized identity filling system 106 determines a time frame of accessibility for a user attribute (e.g., based on parameters established by the client device associated with the user attribute) and revokes access upon expiration of the time frame. In another example, the decentralized identity filling system 106 can share a decentralized identity credential (or one of its user attributes) of one client device for use by another client device within a designated period of time (e.g., via a JSON Web Token). The decentralized identity filling system 106 operating on the client device associated with the decentralized identity credential can submit a request, to the credential issuer, to revoke the access of the other client device (e.g., upon detecting a usage anomaly). The decentralized identity filling system 106 can add the revoked credential to a global sanction list to prevent further usage and request issuance of a new decentralized identity credential.

Figure 4:
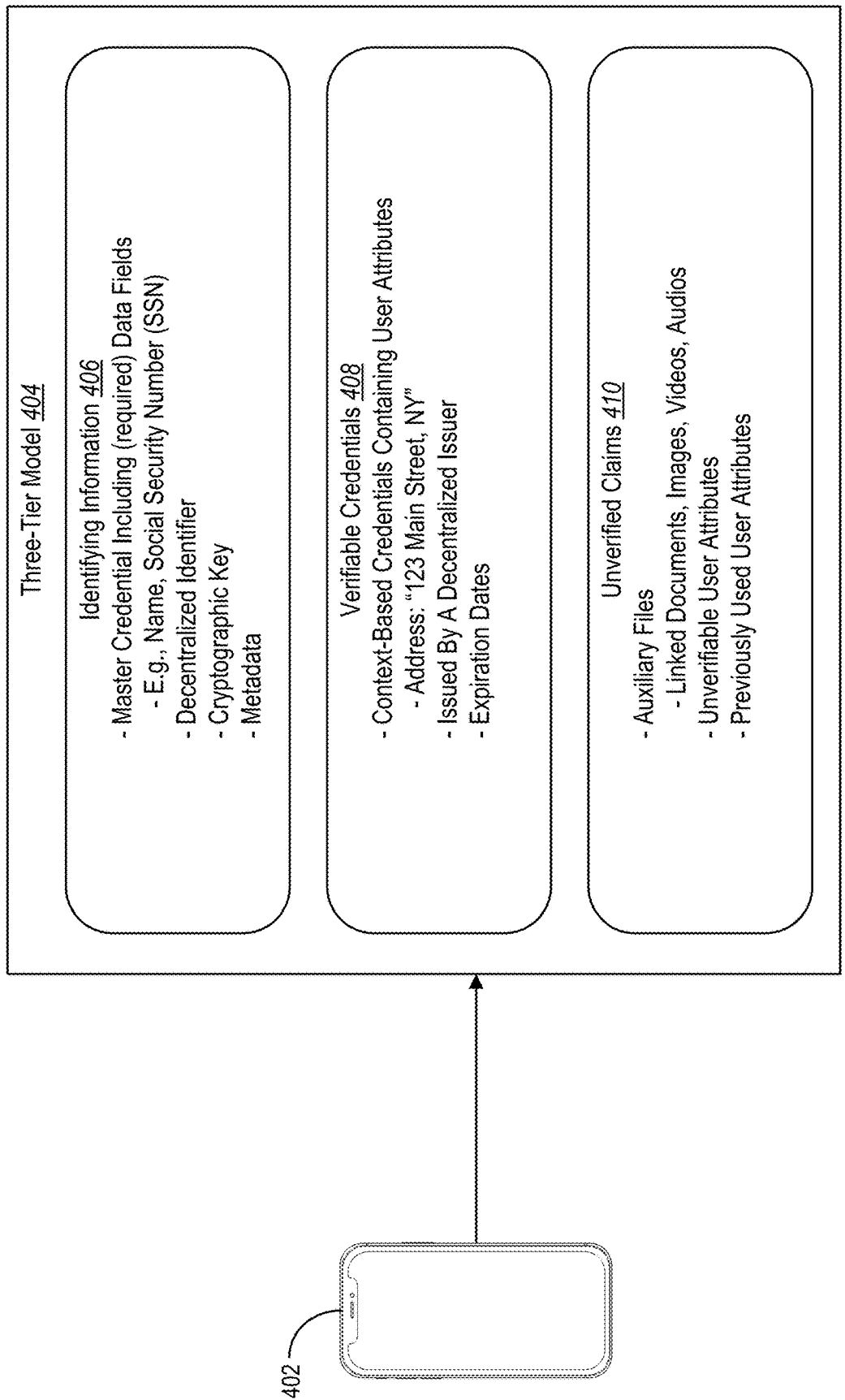
FIG. 4 illustrates a three-tier user identity model that corresponds to a client device in accordance with one or more embodiments.

As previously mentioned, the decentralized identity filling system 106 stores user identity information for a client device—including issued decentralized identity credentials—within a user identity model for the client device. As further mentioned, in some cases, the decentralized identity filling system 106 utilizes a three-tier user identity model. FIG. 4 illustrates a three-tier user identity model 404 that corresponds to a client device 402 in accordance with one or more embodiments.

As shown in FIG. 4, the three-tier user identity model 404 includes a first layer having identifying information 406 of the client device 402. For instance, as shown, the identifying information 406 includes the master credential for the client device 402, including attributes that are associated with the master credential to indicate its uniqueness to the client device 402 (e.g., name or social security number). As further shown, the identifying information 406 includes the decentralized identifier of the client device 402 and at least one cryptographic key (i.e., a public key) associated with the client device 402. Further, the identifying information 406 includes metadata associated with the client device 402 and/or associated with the three-tier user identity model 404.

Additionally, as shown in FIG. 4, the three-tier user identity model 404 includes a second layer having verifiable credentials 408 of the client device 402. For instance, as shown, the verifiable credentials 408 includes context-based credentials that include user attributes that can be used to fill in the digital fillable fields of a digital document. As further indicated by FIG. 4, the verifiable credentials 408 included in the three-tier user identity model 404 have been issued by a decentralized issuer. Accordingly, in one or more embodiments, the verifiable credentials 408 include a signature of the decentralized issuer that can be used in the verification process. Further, as shown, the verifiable credentials 408 are associated with expiration dates. In particular, in some embodiment, each verifiable credential is associated with a corresponding expiration date, indicating a time at which the verifiable credential expires. In some cases, upon expiration, the decentralized identity filling system 106 deletes a verifiable credential from the three-tier user identity model 404 or submits the verifiable credential to the decentralized issuer for renewal.

Further, as shown in FIG. 4, the three-tier user identity model 404 includes a third layer having unverified claims 410 (e.g., unverified user attributes) of the client device 402. For instance, as shown, the unverified claims 410 include auxiliary files, such as files that can be attached to, embedded within, or linked to a digital document. As further indicated, the unverified claims 410 include unverifiable user attributes (e.g., user attributes for which verification is unlikely, such as a personal preference or a hobby). Additionally, as shown, the unverified claims 410 include user attributes that have previously been used but have not yet been verified. For instance, such user attributes can include those that have been previously used to fill in another digital document (e.g., via manual entry by the client device 402) or otherwise extracted from another digital document but have not yet been submitted to a decentralized issuer for issuance as part of a decentralized identity credential. In one or more embodiments, the decentralized identity filling system 106 recategorizes such user attributes as they are issued as part of a decentralized identity credential.

To provide an example, the decentralized identity filling system 106 can access (e.g., by filling in or receiving) a digital document related to employment associated with the client device 402. In particular, the digital document can indicate that the client device 402 (e.g., the user of the client device 402) is associated with employment by a particular organization. For instance, the digital document could include a statement added by the client device 402 regarding the employment or an offer letter or contract for employment that is signed by the client device 402. Accordingly, the decentralized identity filling system 106 can extract a user attribute from the document that indicates employment with the organization. The decentralized identity filling system 106 can submit the user attribute to the corresponding decentralized issuer for issuance as part of a verifiable credential. In some cases, the decentralized identity filling system 106 submits the user attribute for issuance upon extraction. In some implementations, however, the decentralized identity filling system 106 submits the user attribute in response to receiving user input via the client device 402.

Figure 5A:
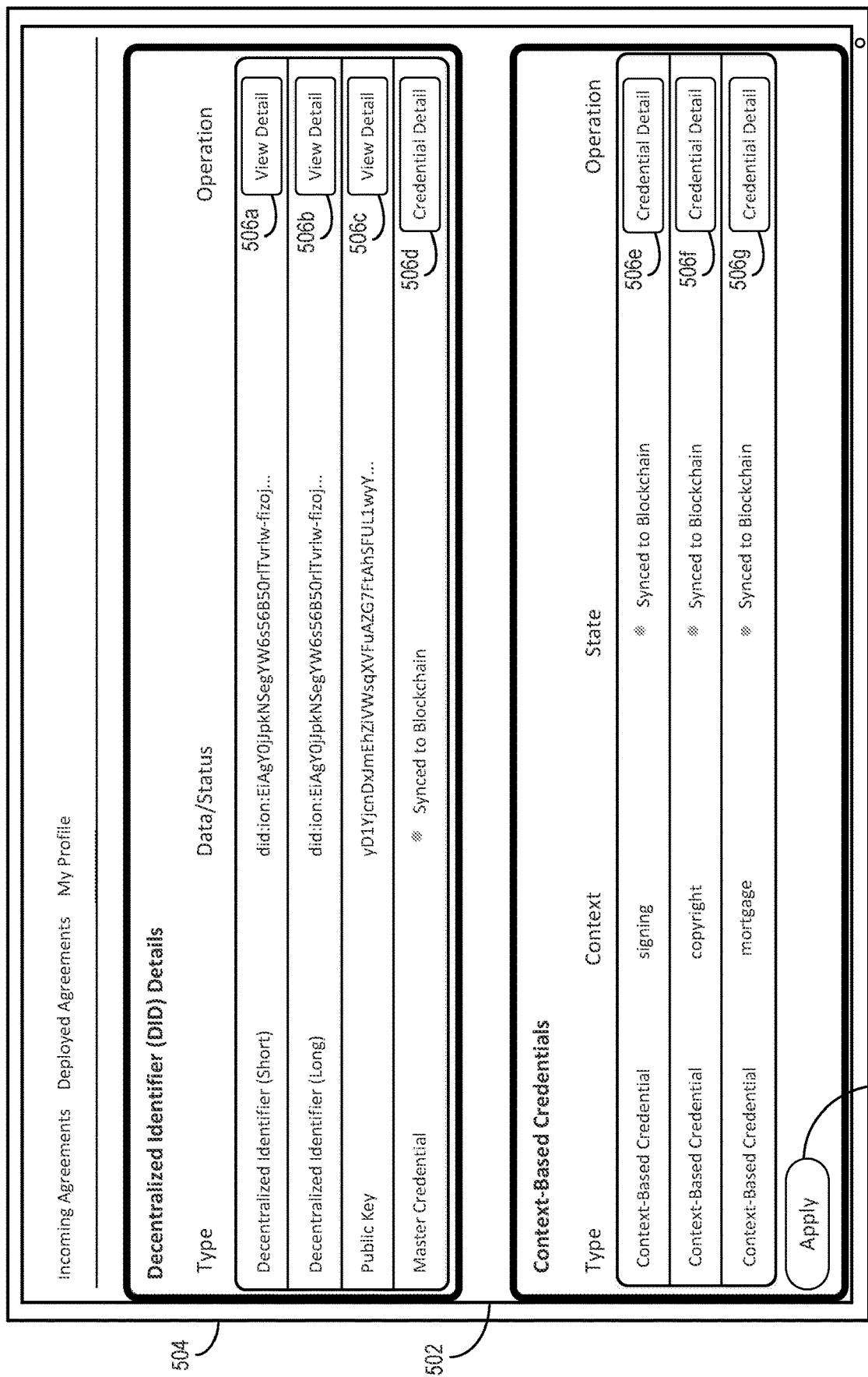
FIGS. 5A-5B illustrate a graphical user interface utilized by the decentralized identity filling system for displaying a user identity model corresponding to a client device in accordance with one or more embodiments.
Figure 5B:
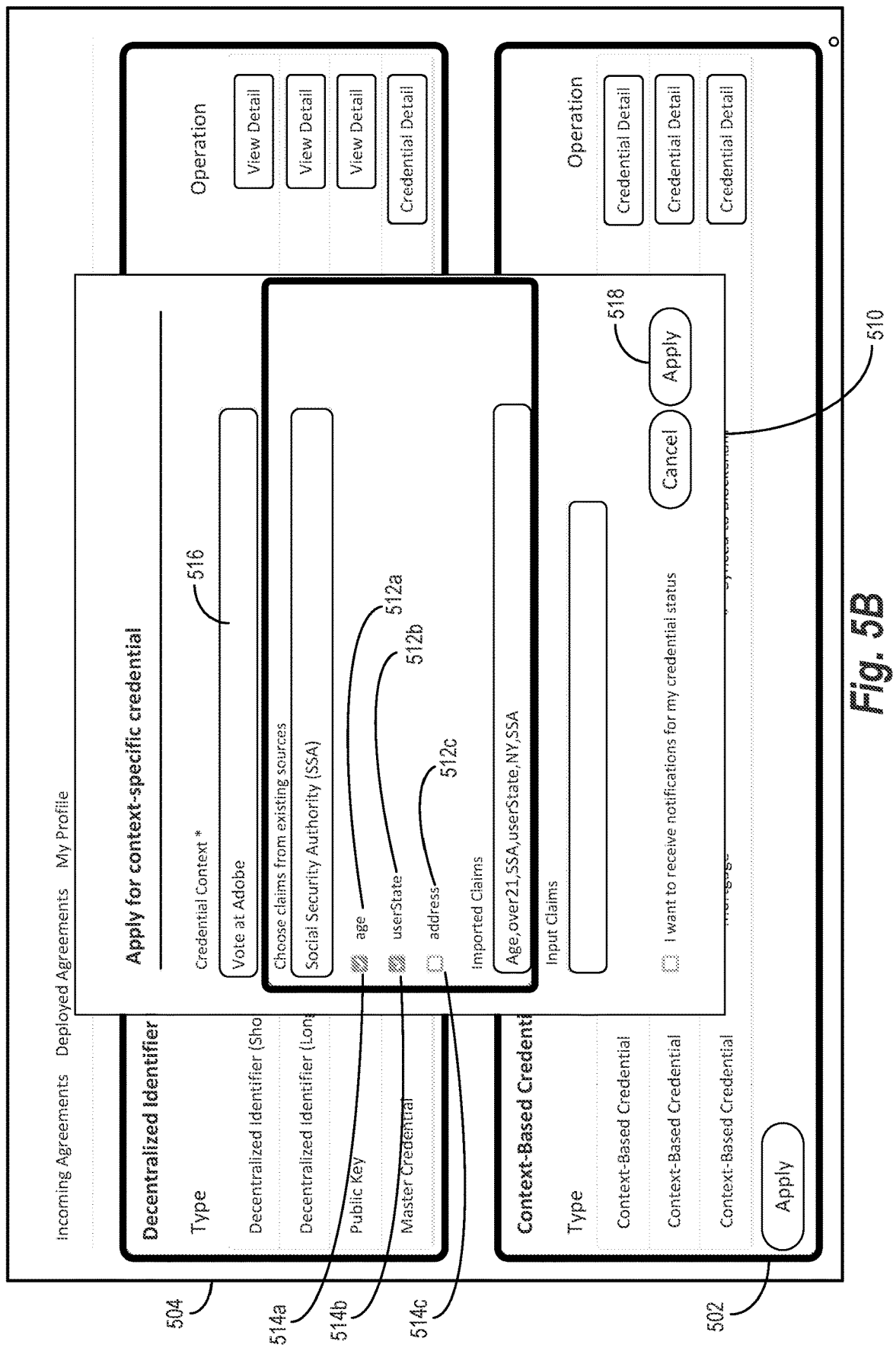

In one or more embodiments, the decentralized identity filling system 106 provides visual elements representing the user identity model for display on the corresponding client device. Accordingly, the decentralized identity filling system 106 facilitates review of and/or user interaction with the user identity model. FIGS. 5A-5B illustrate a graphical user interface utilized by the decentralized identity filling system 106 for displaying a user identity model corresponding to a client device in accordance with one or more embodiments. In particular, FIGS. 5A-5B illustrate a graphical user interface displaying user identity information from a three-tier user identity model.

Indeed, as shown in FIG. 5A, the decentralized identity filling system 106 provides user identity information from a first layer (e.g., identifying information) and a second layer (e.g., verifiable credentials) of a user identity model for display within a graphical user interface 502 of a client device 504. As further shown in FIG. 5A, the decentralized identity filling system 106 provides selectable options 506a-506g for viewing each stored segment of user identity information. Thus, upon selection of one of the selectable options 506a-506g, the decentralized identity filling system 106 provides (e.g., via another window or an expansion of the graphical user interface 502) additional detail regarding the corresponding segment of user identity information.

Additionally, as shown in FIG. 5A, the decentralized identity filling system 106 provides a selectable option 508 for submitting a request for issuance of a verifiable credential (e.g., a context-based credential). In one or more embodiments, upon selection of the selectable option 508, the decentralized identity filling system 106 provides further options (e.g., via another window or an expansion of the graphical user interface 502) for selecting or entering claims (e.g., user attributes) to submit for verification. The decentralized identity filling system 106 provides the claims to a decentralized issuer and receives an issued verifiable credential in response. In one or more embodiments, upon receiving the issued verifiable credential, the decentralized identity filling system 106 updates the graphical user interface 502 to display an indication of the issued verifiable credential as well as a selectable option for viewing additional detail.

Similarly, as shown in FIG. 5B, the decentralized identity filling system 106 provides user identity information from a third layer (e.g., unverified claims) of a user identity model for display within a window 510. For instance, in some cases, the decentralized identity filling system 106 provides the window 510 within the graphical user interface 502 in response to detecting a user selection of the selectable option 508 for requesting issuance of a verifiable credential (e.g., a context-based credential).

As indicated by FIG. 5B, the decentralized identity filling system 106 provides, within the window 510, unverified claims 512a-512c stored within the third layer of the user identity model (presented as the attribute types of the available claims). The decentralized identity filling system 106 further provides selectable options 514a-514c for selecting which of the claims to submit for issuance. Additionally, the decentralized identity filling system 106 provides an option 516 for entering a context for the requested verifiable credential. In one or more embodiments, upon selection of the selectable option 518, the decentralized identity filling system 106 submits the claims and context to the decentralized issuer and receives the verifiable credential in response. Thus, in some cases, the decentralized identity filling system 106 utilizes the graphical user interface 502 to facilitate recategorizing claims from one layer to another layer of a user identity model of a client device.

It should be understood that various embodiments of the decentralized identity filling system 106 can display visual elements representing a user identity model of a client device in various graphical user interface configurations (e.g., displaying all layers within the same interface or displaying each layer in a separate user interface).

More detail regarding the modification of a digital document using a user identity model will be provided. In particular, as previously mentioned, in some embodiments, the decentralized identity filling system 106 modifies a digital document by filling in its digital fields with user attributes stored within the user identity model (e.g., as part of decentralized identity credentials).

FIG. 6 illustrates a data representation of a digital document 600 having a plurality of digital fillable fields in accordance with one or more embodiments. In particular, FIG. 6 illustrates the digital document 600 represented as a list of key-value pairs. In one or more embodiments, each digital fillable field of the digital document 600 corresponds to a key-value pair where the key indicates the information to be provided and the value corresponds to the user attribute to be provided by the client device accessing the digital document 600.

Figure 7:
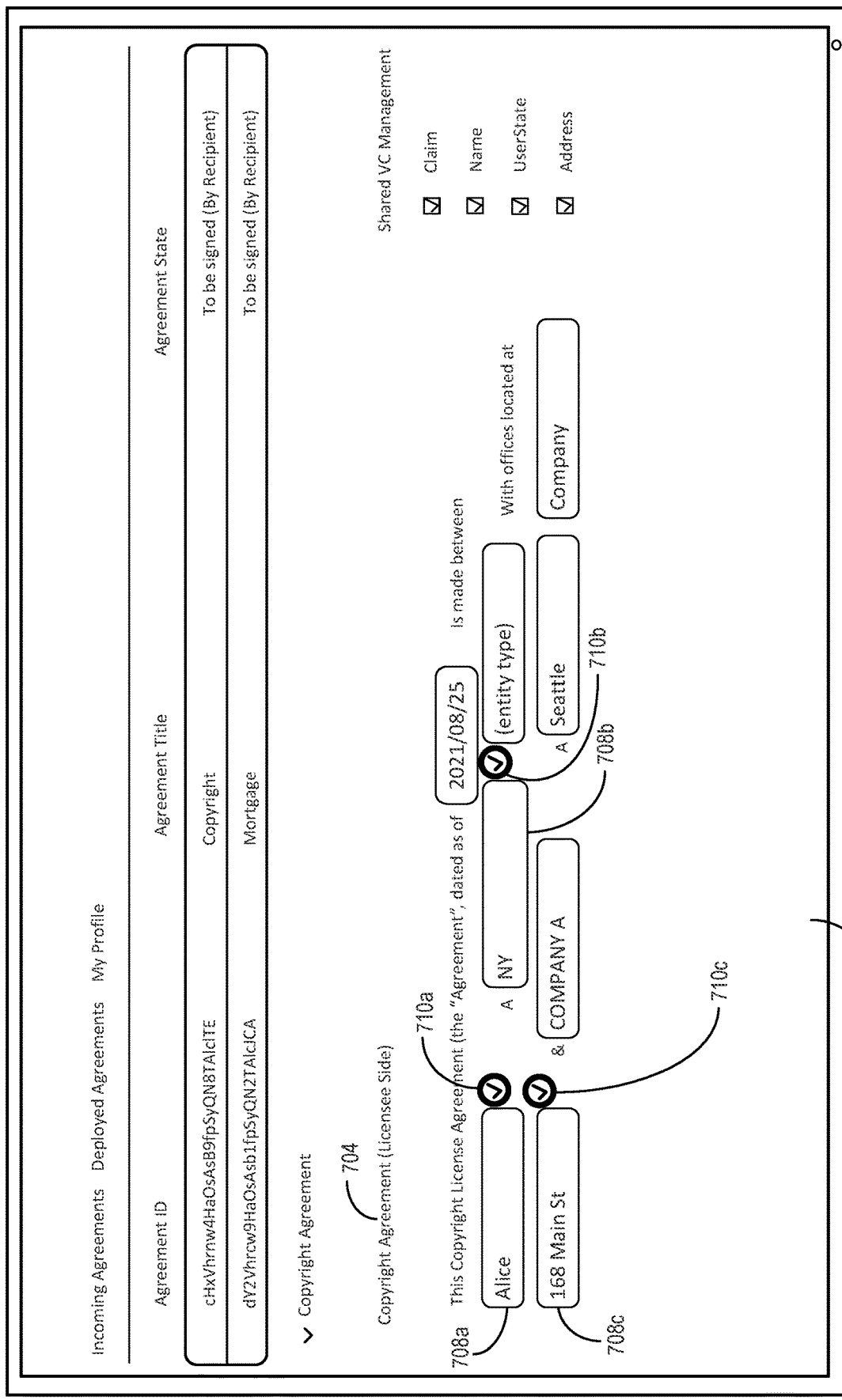
FIG. 7 illustrates a graphical user interface utilized by the decentralized identity filling system to provide a user interface representation of a digital document in accordance with one or more embodiments.

FIG. 7 illustrates a graphical user interface 702 utilized by the decentralized identity filling system 106 to provide a user interface representation of a digital document 704 in accordance with one or more embodiments. Also, as shown, the digital document 704 includes a plurality of digital fillable fields. As indicated, the decentralized identity filling system 106 filled in various of the digital fillable fields (e.g., the digital fillable fields 708a-708c) with user attributes of the client device 706.

In one or more embodiments, the decentralized identity filling system 106 fills in the digital fillable fields of the digital document 704 by retrieving one or more relevant decentralized identity credentials from the user identity model of the client device 706. In particular, the decentralized identity filling system 106 retrieves the decentralized identity credential(s) upon accessing the digital document 704 via the client device 706. For instance, in some cases, the decentralized identity filling system 106 determines a context associated with the digital document 704 and retrieves a corresponding context-based credential.

In some embodiments, the decentralized identity filling system 106 further determines which user attributes from the retrieved decentralized identity credential(s) correspond to the digital fillable fields of the digital document 704. In particular, the decentralized identity filling system 106 utilizes a key-value matching algorithm to determine whether a user attribute corresponds to a digital fillable field. In one or more embodiments, a key-value matching algorithm includes a computer-implemented algorithm for determining a relationship between a key and a value. In particular, in some embodiments, a key-value matching algorithm includes a computer-implemented algorithm for predicting the value from a plurality of values that most closely corresponds to a particular key. For instance, in some cases, the decentralized identity filling system 106 utilizes a key-value matching algorithm to determine the user attribute (e.g., value) from a plurality of user attributes of a decentralized identity information that most closely corresponds to a digital fillable field (e.g., key). In other words, the decentralized identity filling system 106 utilizes the key-value matching algorithm to determine and identify the user attribute that contains the information requested by the digital fillable field.

In one or more embodiments, the decentralized identity filling system 106 utilizes a string matching algorithm—such as a fuzzy matching algorithm—as the key-value matching algorithm. The algorithm presented below represents a characterization of how the key-value matching algorithm implemented by the decentralized identity filling system 106 in accordance with some embodiments.

---

Algorithm 1

---

Input: One key string (denoted as target) in the digital fillable fields; the credential data $cred_{ctx}$
Output: y
Initialization: y := ⊥, max_possibililty := 0;
$\{claim_i\}$ ← parse($cred_{ctx}$);
for each $claim_i$ in $\{claim_i\}$ do
   find the longest common substring (lcs) between $claim_i$ and target;
   $\theta_1$ := lcs. length( )/$claim_i$. length( );
   $\theta_2$ := lcs. length( )/target. length( );
   $\theta$ := max$\{\theta_1, \theta_2\}$;
   if $\theta$ = 0 then
     continue;
   else
     if $\theta$ > max_possibility then
        max_possibility = $\theta$;
        y = $claim_i$;
return y

---

Indeed, in one or more embodiments, the decentralized identity filling system 106 utilizes algorithm 1 to return, for a digital fillable field, the most possible user attribute contained in the decentralized identity credential. In some cases, the decentralized identity filling system 106 fills in the digital fillable field using the returned user attribute. In some cases, the time complexity of algorithm 1 is O(n) where n is the number of claims contained in the decentralized identity credential. In other words, O(n) represents the time taken to fill in a digital fillable field. As such, in accordance with algorithm 1, the time complexity to fill in m digital fillable fields in a digital document is O(nm) in some implementations.

In one or more embodiments, if ⊥ is returned, the decentralized identity filling system 106 determines that no matching user attribute is included in the decentralized identity credential. Accordingly, the decentralized identity filling system 106 determines that the digital fillable field needs to be manually filled. Thus, in some cases, the decentralized identity filling system 106 fills the digital fillable field based on one or more user interactions with the digital fillable field via the client device 706.

As previously mentioned, in some cases, multiple client devices are associated with a digital document and provide user attributes for its digital fillable fields. Accordingly, it should be understood that the decentralized identity filling system 106 identifies which digital fillable fields correspond to a particular client device and fills in those digital fields using the user attributes of that client device. In some cases, the decentralized identity filling system 106 prevents user attributes of one client device from being used to fill in digital fillable fields that correspond to another client device associated with the same digital document.

As further shown in FIG. 7, the decentralized identity filling system 106 provides verification indications 710a-710c for display in association with (e.g., next to) the digital fillable fields 708a-708c that have been filled in using the user attributes of the client device 706. Indeed, in some embodiments, upon determining that a user attribute (or its decentralized identity credential) has been verified, the decentralized identity filling system 106 provides a verification indication for that user attribute. In some cases, the decentralized identity filling system 106 determines that the user attribute has been verified via another client device associated with the digital document 704. Likewise, in some implementations, the decentralized identity filling system 106 operating on the client device 706 verifies user attributes entered into the digital document 704 by other associated client devices.

To illustrate, in some embodiments, when a user attribute of the client device 706 is verified via another client device, the decentralized identity filling system 106 operating on the client device 706 receives a verification challenge for verifying a user attribute (or its decentralized identity credential). In one or more embodiments, a verification challenge includes a communication indicating that a user attribute is going to be verified. In particular, in some embodiments, a verification challenge includes a communication from a first client device to a second client device indicating that the second client device is going to verify a user attribute of the first client device. In one or more embodiments, the decentralized identity filling system 106 operating on the client device 706 signs the verification challenge (e.g., using a cryptographic key, such as a private key) and provides the signed verification challenge to the other client device. The decentralized identity filling system 106 at the client device 706 further determines that the user attribute has been verified and provides a verification indication for display in response.

In some embodiments, when operating on the client device 706 to verify a user attribute of another client device, the decentralized identity filling system 106 sends a verification challenge to the other client device and receives a signature of the other client device in return (e.g., via a signed verification challenge). The decentralized identity filling system 106 validates the signature of the other client device to ensure that the other client device holds the correct cryptographic key. The decentralized identity filling system 106 further verifies whether the signature of the decentralized issuer that issued the decentralized identity credential associated with the user attribute is valid. In one or more embodiments, the decentralized identity filling system 106 further determines that the other client device (e.g., a cryptographic key of the other client device, such as a public key whether a general public key or a public key created for issuance of a context-based credential) is not included in a public revocation list. Further, in some cases, the decentralized identity filling system 106 determines that the openings of the user attribute's commitments in the decentralized identity credential, if they exist, are correct.

The algorithm presented below represents at least one characterization of how the decentralized identity filling system 106 verifies a user attribute entered into a digital document in accordance with one or more embodiments.

---

Algorithm 2

---

Input: The decentralized identity credential $cred_{ctx}$ that is used to fill the digital document; a verification challenge c; the public key $pk^C$ of the decentralized issuer; and the context-specific public key $pk_{ctx}^u$ of the client device associated with the decentralized identity credential.
Output: The verifying client device v returns true/false
for the client device u associated with the decentralized identity credential
   Send ($cred_{ctx}$, σ) to the verifying client device v where σ := Sign($sk_{ctx}^u$, c) for the verifying client device v
   if Verify($pk_{ctx}^u$, c, σ) ∧ Verify($pk^C$, $cred_{ctx}$\$o^c$, $o^c$) then
     return true
   else
     return false If algorithm 2 returns true (indicating that the decentralized identity credential is verified), the decentralized identity filling system 106 provides a verification icon for its user attributes that have been entered into the digital document 704. If algorithm 2 returns false, or if the entered user attributes are retrieved from the third layer of the user identity model (e.g., unverified claims), the decentralized identity filling system 106 does not provide a verification indication. In some cases, the decentralized identity filling system 106 allows for further editing of the digital fillable fields without verification icons.

In one or more embodiments, the decentralized identity filling system 106 provides verification icons for verified user attributes for display on a plurality of client devices associated with the digital document 704. Thus, the decentralized identity filling system 106 enables the client device associated with a user attribute to display that it has been verified and also enables the verifying client device (or other client devices) to display that is has been verified. Accordingly, in some cases, the decentralized identity filling system 106 indicates the validity of entered information to all parties to a digital document.

Figure 8:
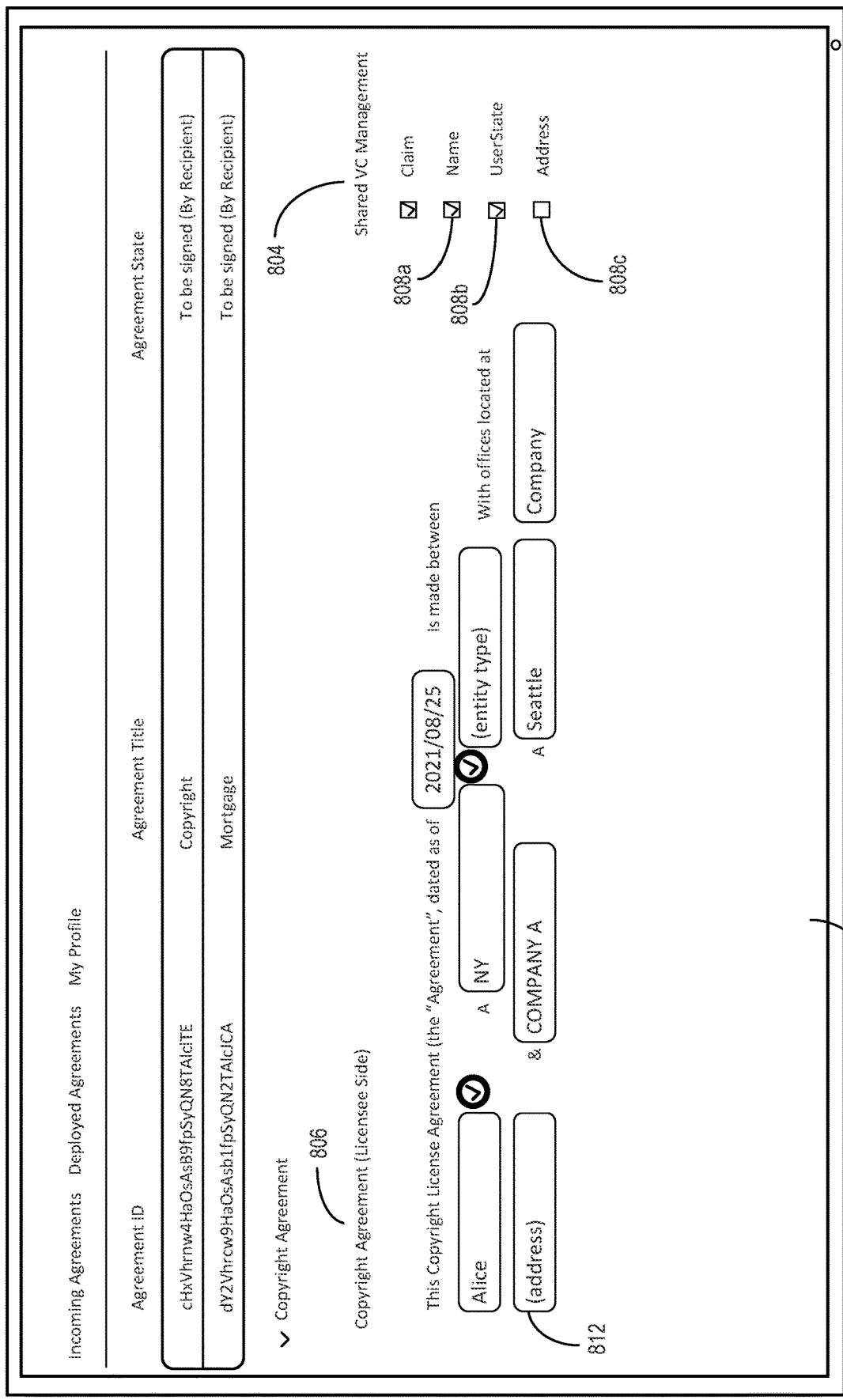
FIG. 8 illustrates a graphical user interface utilized by the decentralized identity filling system to facilitate the modification of user attributes entered into a digital document in accordance with one or more embodiments.

As previously mentioned, in some embodiments, the decentralized identity filling system 106 allows the modification of user attributes that have been entered into a digital document, including those user attributes that have been verified. In particular, in some embodiments, the decentralized identity filling system 106 enables the modification via the client device associated with the user attributes. FIG. 8 illustrates a graphical user interface 802 utilized by the decentralized identity filling system 106 to facilitate the modification of user attributes entered into a digital document in accordance with one or more embodiments.

Indeed, as shown in FIG. 8, the decentralized identity filling system 106 provides, for display within the graphical user interface 802, an interactive list 804 of user attributes represented in the digital document 806. In particular, the interactive list 804 includes user attributes of the client device 810 that the decentralized identity filling system 106 used to fill in the digital document 806 (e.g., user attributes from verifiable credentials). As further shown, the decentralized identity filling system 106 provides, within the interactive list 804, interactive elements 808a-808c that correspond to the user attributes.

In one or more embodiments, in response to detecting a user interaction with one of the interactive elements 808a-808c, the decentralized identity filling system 106 enables modification of the corresponding digital fillable field. For instance, in some cases, the decentralized identity filling system 106 deletes the user attribute from the corresponding digital fillable. Indeed, as shown in FIG. 8, the decentralized identity filling system 106 removes the user attribute from the digital fillable field 812 in response to a user selection of the interactive element 808c. The decentralized identity filling system 106 further adds another user attribute within the digital fillable field in response to one or more additional user interactions. In some cases, the decentralized identity filling system 106 maintains the user attribute within the digital fillable field but modifies the user attribute in response to one or more additional user interactions.

In some implementations, the decentralized identity filling system 106 further removes the verification indication associated with a user attribute in response to a user selection of a corresponding interactive element. Indeed, as shown in FIG. 8, the decentralized identity filling system 106 removes the verification indication associated with the user attribute that was previously within the digital fillable field 812. Accordingly, the decentralized identity filling system 106 provides an indication that the user attribute that will be included within the digital fillable field 812 is not a verified user attribute.

By facilitating the modification of user attributes that have been added to a digital document, including user attributes that have already been verified, the decentralized identity filling system 106 allows for flexibility in the filling process. In particular, the decentralized identity filling system 106 allows for a client device to update its user attributes. In some cases, the decentralized identity filling system 106 subsequently submits updated user attributes for inclusion within a verifiable credential.

Figure 9:
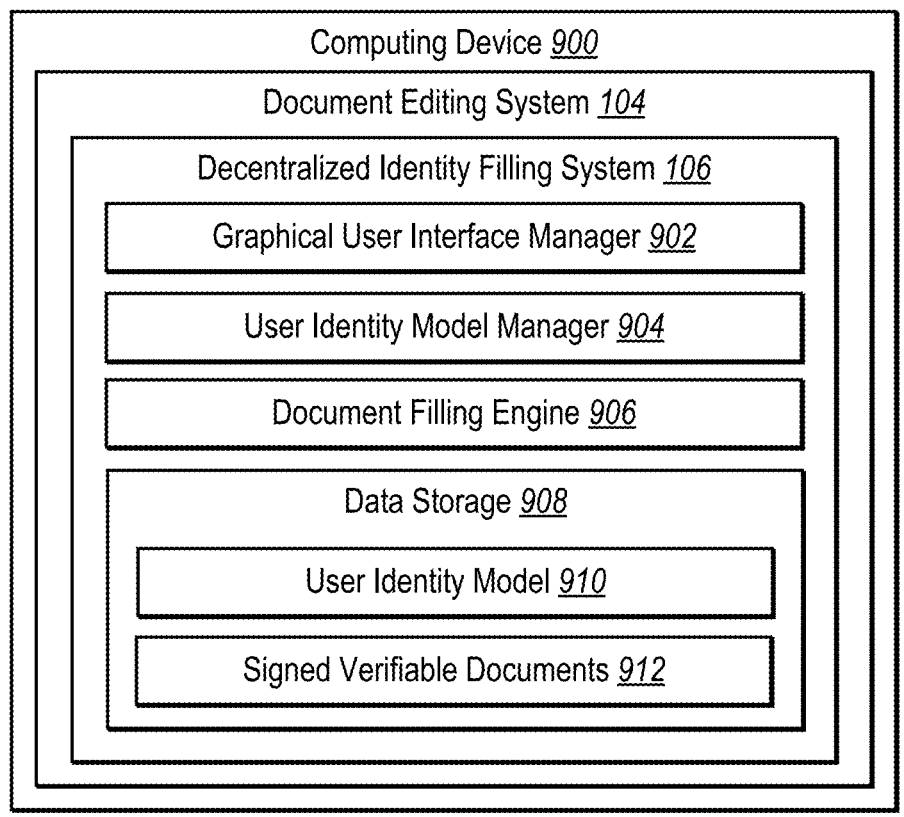
FIG. 9 illustrates an example schematic diagram of a decentralized identity filling system in accordance with one or more embodiments.

Turning now to FIG. 9, additional detail will now be provided regarding various components and capabilities of the decentralized identity filling system 106. In particular, FIG. 9 illustrates the decentralized identity filling system 106 implemented by the computing device 900 (e.g., the server(s) 102, one of the client devices 110a-110n, and/or one of the committee nodes 116a-116d discussed above with reference to FIG. 1). Additionally, the decentralized identity filling system 106 is also part of the document editing system 104. As shown in FIG. 9, the decentralized identity filling system 106 includes, but is not limited to, a graphical user interface manager 902, a user identity model manager 904, a document filling engine 906, and data storage 908 (which includes a user identity model 910 and signed verifiable documents 912).

As just mentioned, and as illustrated in FIG. 9, the decentralized identity filling system 106 includes the graphical user interface manager 902. In one or more embodiments, the graphical user interface manager 902 provides visual elements for display on a client device. For instance, in some cases, the graphical user interface manager 902 provides a digital document or the user identity information stored in a user identity model for display. In some cases, the graphical user interface manager 902 further detects and reacts to user interactions via a graphical user interface. For instance, in some cases, the graphical user interface manager 902 detects user interactions with a digital fillable field to enter a user attribute or detects a user interaction with an interactive element to edit a previously entered user attribute.

Additionally, as shown in FIG. 9, the decentralized identity filling system 106 includes the user identity model manager 904. In one or more embodiments, the user identity model manager 904 establishes and manages a user identity model for a client device. For instance, in some cases, the user identity model manager 904 creates one or more cryptographic keys for the client device. Further, the user identity model manager 904 submits requests for issuance of decentralized identity credentials to a decentralized issuer. For instance, in some cases, the user identity model manager 904 submits one or more claims to the decentralized issuer and receives a verifiable credential in response. The user identity model manager 904 can store the credentials, along with claims and other user identity information, within the layers of a user identity model. In some cases, the decentralized identity filling system 106 recategorizes claims stored within one layer of a user identity model into another layer when those claims are included within a decentralized identity credential.

Further, as shown in FIG. 9, the decentralized identity filling system 106 includes the document filling engine 906. In one or more embodiments, the document filling engine 906 modifies a digital document by filling in its digital fillable fields with user attributes of a client device. For instance, in some cases, the document filling engine 906 retrieves a decentralized identity credential that corresponds to an accessed digital document and utilizes the user attributes of the decentralized identity credential to fill in the digital fillable fields of the digital document. In some cases, the document filling engine 906 further verifies the user attributes that have been added to the digital document via other associated client devices. For instance, in one or more embodiments, the document filling engine 906 implements the key-value matching algorithm (algorithm 1) and the user identity verification algorithm (algorithm 2) discussed above.

As shown in FIG. 9, the decentralized identity filling system 106 also includes data storage 908. In particular, data storage 908 (implemented by one or more memory devices) includes the user identity model 910 and the signed verifiable documents 912. In one or more embodiments, the user identity model 910 stores the user identity model for a client device. For instance, in some cases, the user identity model 910 stores a three-tier user identity model. In some embodiments, the signed verifiable documents 912 stores digital documents that have been filled with user attributes via decentralized identity credentials.

Each of the components 902-912 of the decentralized identity filling system 106 can include software, hardware, or both. For example, the components 902-912 can include one or more instructions stored on a computer-readable storage medium and executable by processors of one or more computing devices, such as a client device or server device. When executed by the one or more processors, the computer-executable instructions of the decentralized identity filling system 106 can cause the computing device(s) to perform the methods described herein. Alternatively, the components 902-912 can include hardware, such as a special-purpose processing device to perform a certain function or group of functions. Alternatively, the components 902-912 of the decentralized identity filling system 106 can include a combination of computer-executable instructions and hardware.

Furthermore, the components 902-912 of the decentralized identity filling system 106 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 902-912 of the decentralized identity filling system 106 may be implemented as a stand-alone application, such as a desktop or mobile application. Furthermore, the components 902-912 of the decentralized identity filling system 106 may be implemented as one or more web-based applications hosted on a remote server. Alternatively, or additionally, the components 902-912 of the decentralized identity filling system 106 may be implemented in a suite of mobile device applications or "apps." For example, in one or more embodiments, the decentralized identity filling system 106 can comprise or operate in connection with digital software applications such as ADOBE® ACROBAT® SIGN or ADOBE® DOCUMENT CLOUD®. The foregoing are either registered trademarks or trademarks of Adobe Inc. in the United States and/or other countries.

Figure 10:
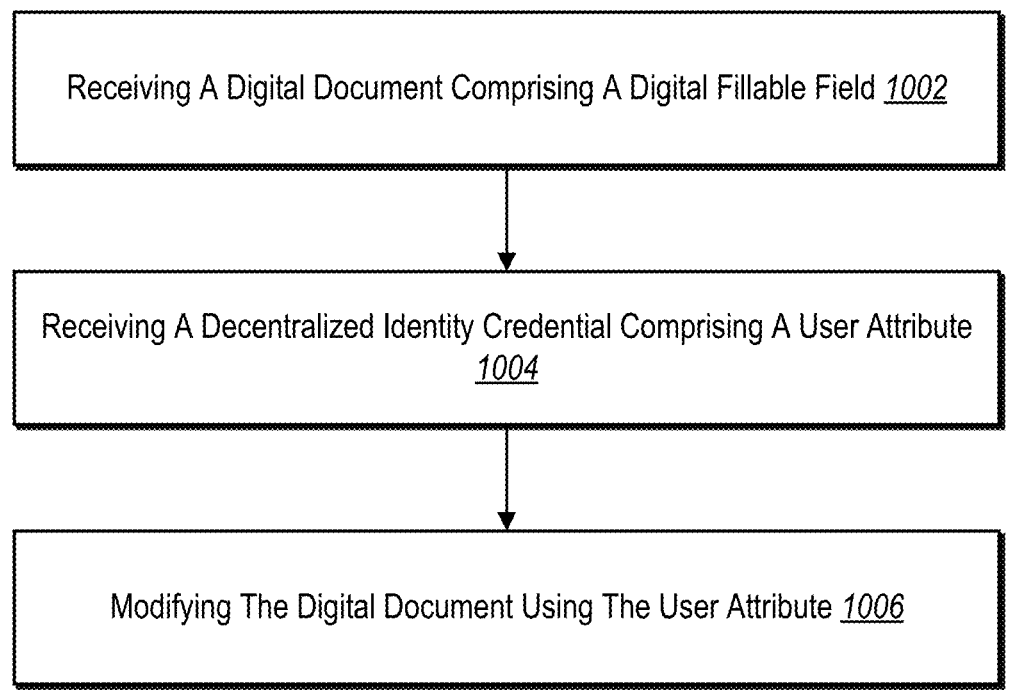
FIG. 10 illustrates a flowchart of a series of acts for modifying a digital document accessed by a client device using a user attribute retrieved from a user identity model of the client device in accordance with one or more embodiments.

FIGS. 1-9, the corresponding text, and the examples provide a number of different methods, systems, devices, and non-transitory computer-readable media of the decentralized identity filling system 106. In addition to the foregoing, one or more embodiments can also be described in terms of flowcharts comprising acts for accomplishing the particular result, as shown in FIG. 10. FIG. 10 may be performed with more or fewer acts. Further, the acts may be performed in different orders. Additionally, the acts described herein may be repeated or performed in parallel with one another or in parallel with different instances of the same or similar acts.

FIG. 10 illustrates a flowchart of a series of acts 1000 for modifying a digital document accessed by a client device using a user attribute retrieved from a user identity model of the client device in accordance with one or more embodiments. FIG. 10 illustrates acts according to one embodiment, alternative embodiments may omit, add to, reorder, and/or modify any of the acts shown in FIG. 10. In some implementations, the acts of FIG. 10 are performed as part of a computer-implemented method. Alternatively, a non-transitory computer-readable medium can store executable instructions that, when executed by a processing device, cause the processing device to perform operations comprising the acts of FIG. 10. In some embodiments, a system performs the acts of FIG. 10. For example, in one or more embodiments, a system includes one or more memory components. The system further includes one or more processing devices coupled to the one or more memory components, the one or more processing devices to perform operations comprising the acts of FIG. 10.

The series of acts 1000 includes an act 1002 for receiving a digital document comprising a digital fillable field. In some cases, the digital document includes a plurality of digital fillable fields.

Additionally, the series of acts 1000 includes an act 1004 for retrieving a decentralized identity credential comprising a user attribute. For instance, in some embodiments, the act 1004 involves retrieving, for a client device associated with the digital document, a decentralized identity credential comprising a user attribute established under a decentralized identity framework.

In one or more embodiments, retrieving the decentralized identity credential established under the decentralized identity framework comprises retrieving a verifiable credential from a multi-tier user identity model of the client device. For example, in some cases, retrieving the decentralized identity credential established under the decentralized identity framework comprises retrieving a verifiable credential from a multi-tier user identity model of the client device, the multi-tier user identity model comprising a first layer for a decentralized identifier of the client device, a second layer for verifiable credentials of the client device, and a third layer for unverified user attributes of the client device. In some cases, the decentralized identity filling system 106 recategorizes user attributes from the third layer to the second layer of the user identity model. For instance, in some implementations, the decentralized identity filling system 106 submits, to a decentralized issuer of the decentralized identity framework, a request for an additional decentralized identity credential comprising an additional user attribute associated with the third layer of the multi-tier user identity model of the client device; and associating, in response to receiving the additional decentralized identity credential, the additional user attribute with the second layer of the multi-tier user identity model of the client device.

In some embodiments, retrieving the decentralized identity credential established under the decentralized identity framework comprises retrieving the decentralized identity credential from a distributed digital ledger of the decentralized identity framework.

Further, the series of acts 1000 includes an act 1006 for modifying the digital document using the user attribute. For example, in some cases, the act 1006 involves modifying the digital document by filling in the digital fillable field using the user attribute of the decentralized identity credential.

In one or more embodiments, the decentralized identity filling system 106 determines, utilizing a key-value matching algorithm, that the user attribute of the decentralized identity credential corresponds to the digital fillable field. Accordingly, in some cases, filling in the digital fillable field using the user attribute is based on determining that the user attribute corresponds to the digital fillable field. As one example, in some cases, the decentralized identity filling system 106 determines, utilizing a fuzzy matching algorithm, that the user attribute of the decentralized identity credential corresponds to the digital fillable field. Accordingly, in some cases, filling in the digital fillable field using the user attribute is based on determining (e.g., via the fuzzy matching algorithm) that the user attribute corresponds to the digital fillable field. In some embodiments, the decentralized identity filling system 106 further determines, utilizing a fuzzy matching algorithm, that an additional digital fillable field of the digital document is unrelated to user attributes of the decentralized identity credential; and modifies the digital document by filling in the additional digital fillable field based on one or more user interactions with the digital fillable field.

In some embodiments, the decentralized identity filling system 106 determines that the user attribute comprises sensitive personal information; and generates a privacy-preserving argument that indicates the sensitive personal information satisfies a threshold. Accordingly, in some instances, filling in the digital fillable field using the user attribute of the decentralized identity credential comprises filling in the digital fillable field using the privacy-preserving argument.

In some implementations, the series of acts 1000 further includes acts for requesting issuance of the decentralized identity credential. For example, in some cases, the acts include generating a request for the decentralized identity credential utilizing a cryptographic key associated with the client device, a master credential issued by a decentralized issuer of the decentralized identity framework, and the user attribute; and transmitting the request to the decentralized issuer for issuance of the decentralized identity credential.

In some embodiments, the series of acts 1000 further includes acts for facilitating verification of the user attribute added to the digital document. For instance, in some cases, the acts include receiving, from an additional client device associated with the digital document, a verification challenge for verifying the user attribute for the digital fillable field; signing the verification challenge using a cryptographic key associated with the client device; and providing the signed verification challenge to the additional client device for verification of the user attribute. In some implementations, the decentralized identity filling system 106 determines that the user attribute has been verified by the additional client device; and provides, for display on the client device, an indication that the user attribute has been verified. As another example, in some embodiments, the acts include verifying an additional user attribute of an additional client device associated with the digital document by: providing, to the additional client device, a verification challenge for verifying the additional user attribute; receiving a signature of the additional client device in response to providing the verification challenge; validating the signature to determine that the additional client device holds a cryptographic key corresponding to an additional decentralized identity credential associated with the additional user attribute; and validating a signature of a decentralized issuer that issued the additional decentralized identity credential. In some instances, in response to verifying the additional user attribute of the additional client device, the decentralized identity filling system 106 provides a verification indication for display on the client device.

To provide an illustration, in one or more embodiments, the decentralized identity filling system 106 provides, for display on a graphical user interface of a client device, a digital document comprising a digital fillable field; retrieves, from a multi-tier user identity model of the client device, a decentralized identity credential comprising a user attribute established under a decentralized identity framework; modifies the digital document within the graphical user interface of the client device by filling in the digital fillable field using the user attribute; and provides, for display next to the digital fillable field within the graphical user interface, a verification indication based on a verification of the user attribute.

In some cases, the decentralized identity filling system 106 further detects a user interaction with the graphical user interface for editing the digital fillable field; removes, in response to the user interaction, the verification indication from display next to the digital fillable field; and modifies the user attribute within the digital fillable field based on detecting one or more additional user interactions. In some implementations, the decentralized identity filling system 106 provides, for display within the graphical user interface, an interactive list of user attributes represented in the digital document, the interactive list of user attributes comprising an interactive element corresponding to the user attribute. Accordingly, in some cases, detecting the user interaction with the graphical user interface for editing the digital fillable field comprises detecting an interaction with the interactive element corresponding to the user attribute.

In some embodiments, filling in the digital fillable field using the user attribute comprises filling in the digital fillable field using a privacy-preserving argument that indicates the user attribute satisfies a threshold while preventing other client devices associated with the digital document from accessing the user attribute. Further, in some cases, the decentralized identity filling system 106 also modifies the digital document by filling in one or more additional digital fillable fields that are unrelated to the decentralized identity credential based on user interactions with the one or more additional digital fillable fields via the graphical user interface.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 11:
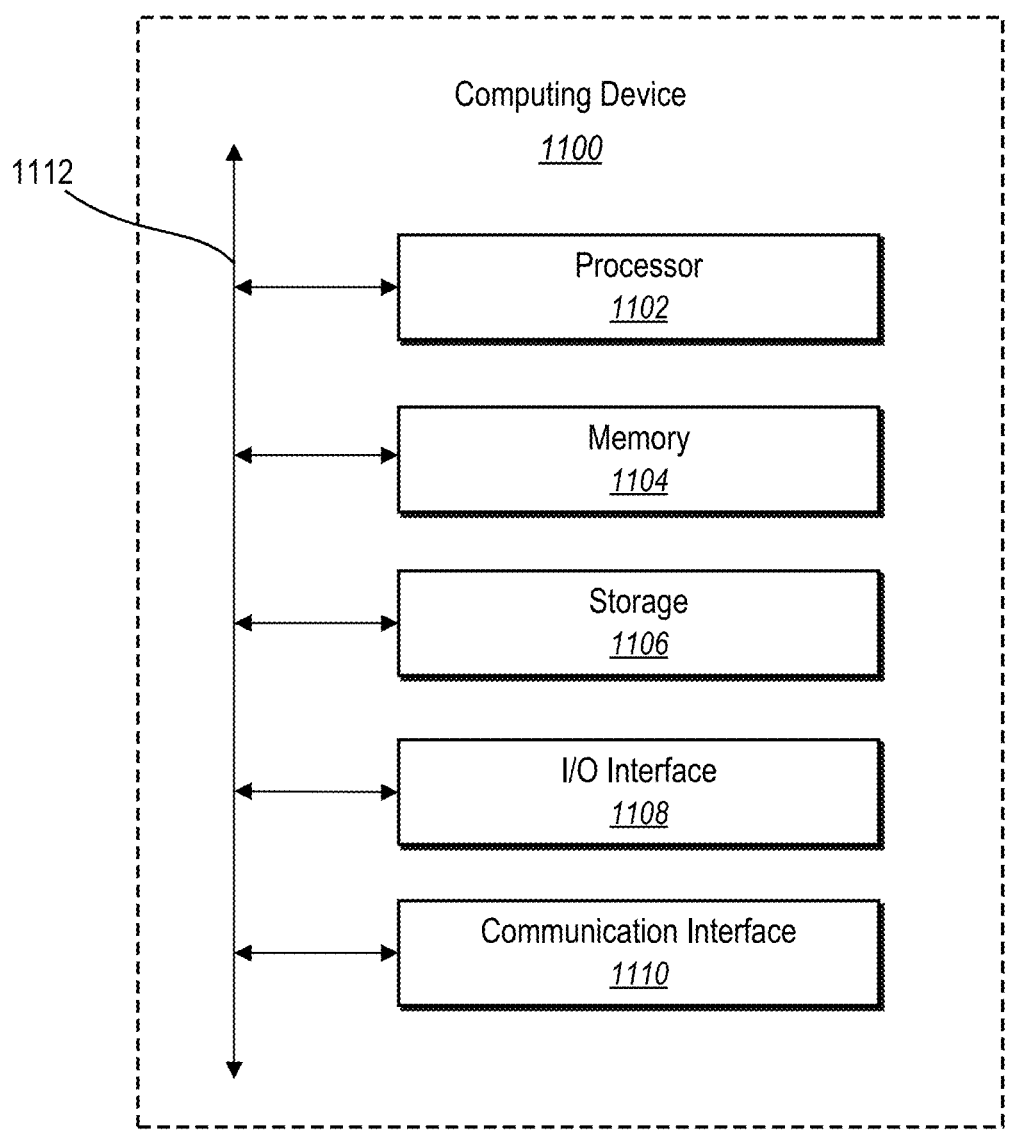
FIG. 11 illustrates a block diagram of an exemplary computing device in accordance with one or more embodiments.

FIG. 11 illustrates a block diagram of an example computing device 1100 that may be configured to perform one or more of the processes described above. One will appreciate that one or more computing devices, such as the computing device 1100 may represent the computing devices described above (e.g., the server(s) 102 and/or the client devices 110a-110n). In one or more embodiments, the computing device 1100 may be a mobile device (e.g., a mobile telephone, a smartphone, a PDA, a tablet, a laptop, a camera, a tracker, a watch, a wearable device). In some embodiments, the computing device 1100 may be a non-mobile device (e.g., a desktop computer or another type of client device). Further, the computing device 1100 may be a server device that includes cloud-based processing and storage capabilities.

As shown in FIG. 11, the computing device 1100 can include one or more processor(s) 1102, memory 1104, a storage device 1106, input/output interfaces 1108 (or "I/O interfaces 1108"), and a communication interface 1110, which may be communicatively coupled by way of a communication infrastructure (e.g., bus 1112). While the computing device 1100 is shown in FIG. 11, the components illustrated in FIG. 11 are not intended to be limiting. Additional or alternative components may be used in other embodiments. Furthermore, in certain embodiments, the computing device 1100 includes fewer components than those shown in FIG. 11. Components of the computing device 1100 shown in FIG. 11 will now be described in additional detail.

In particular embodiments, the processor(s) 1102 includes hardware for executing instructions, such as those making up a computer program. As an example, and not by way of limitation, to execute instructions, the processor(s) 1102 may retrieve (or fetch) the instructions from an internal register, an internal cache, memory 1104, or a storage device 1106 and decode and execute them.

The computing device 1100 includes memory 1104, which is coupled to the processor(s) 1102. The memory 1104 may be used for storing data, metadata, and programs for execution by the processor(s). The memory 1104 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1104 may be internal or distributed memory.

The computing device 1100 includes a storage device 1106 including storage for storing data or instructions. As an example, and not by way of limitation, the storage device 1106 can include a non-transitory storage medium described above. The storage device 1106 may include a hard disk drive (HDD), flash memory, a Universal Serial Bus (USB) drive or a combination these or other storage devices.

As shown, the computing device 1100 includes one or more I/O interfaces 1108, which are provided to allow a user to provide input to (such as user strokes), receive output from, and otherwise transfer data to and from the computing device 1100. These I/O interfaces 1108 may include a mouse, keypad or a keyboard, a touch screen, camera, optical scanner, network interface, modem, other known I/O devices or a combination of such I/O interfaces 1108. The touch screen may be activated with a stylus or a finger.

The I/O interfaces 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1108 are configured to provide graphical data to a display for presentation to a user. The graphical data may be representative of one or more graphical user interfaces and/or any other graphical content as may serve a particular implementation.

The computing device 1100 can further include a communication interface 1110. The communication interface 1110 can include hardware, software, or both. The communication interface 1110 provides one or more interfaces for communication (such as, for example, packet-based communication) between the computing device and one or more other computing devices or one or more networks. As an example, and not by way of limitation, communication interface 1110 may include a network interface controller (NIC) or network adapter for communicating with an Ethernet or other wire-based network or a wireless NIC (WNIC) or wireless adapter for communicating with a wireless network, such as a WI-FI. The computing device 1100 can further include a bus 1112. The bus 1112 can include hardware, software, or both that connects components of computing device 1100 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A method comprising:
    maintaining, within storage, a multi-tier user identity model for a client device, the multi-tier user identity model comprising a layer for verifiable credentials of the client device and an additional layer for unverified user attributes of the client device;
    submitting, to an issuer of verifiable credentials, a request for a verifiable credential that includes a user attribute associated with the additional layer of the multi-tier user identity model of the client device;
    associating, in response to receiving the verifiable credential including the user attribute from the issuer, the user attribute with the layer for verifiable credentials of the multi-tier user identity model of the client device;
    receiving, by at least one processing device, a digital document comprising one or more digital fillable fields for the client device;
    retrieving, for the client device and in response to receiving the digital document, one or more verifiable credentials from the layer for verifiable credentials of the multi-tier user identity model of the client device; and
    modifying, by the at least one processing device, the digital document by filling in the one or more digital fillable fields using one or more user attributes of the one or more verifiable credentials.

2. The method of claim 1, wherein receiving the verifiable credential from the issuer comprises receiving the verifiable credential from a decentralized issuer of a decentralized identity framework.

3. The method of claim 1, wherein maintaining the multi-tier user identity model for the client device comprises maintaining the multi-tier user identity model as part of a distributed digital ledger of a decentralized identity framework.

4. The method of claim 1,
    further comprising determining, utilizing a key-value matching algorithm, that the one or more user attributes of the one or more verifiable credentials corresponds to to the one or more digital fillable fields,
    wherein filling in the one or more digital fillable fields using the one or more user attributes is based on determining that the one or more user attributes correspond to the one or more digital fillable fields.

5. The method of claim 1, further comprising:
    receiving, from an additional client device associated with the digital document, a verification challenge for verifying at least one user attribute of the one or more user attributes;
    signing the verification challenge using a cryptographic key associated with the client device; and providing the signed verification challenge to the additional client device for verification of the at least one user attribute of the one or more user attributes.

6. The method of claim 5, further comprising:
determining that the at least one user attribute of the one or more user attributes has been verified by the additional client device; and
providing, for display on the client device, an indication that the at least one user attribute of the one or more user attributes has been verified.

7. The method of claim 1, further comprising:
determining that a user attribute of the one or more user attributes comprises sensitive personal information; and
generating a privacy-preserving argument that indicates the sensitive personal information satisfies a threshold,
wherein filling in a digital fillable field of one or more digital fillable fields using the user attribute of the one or more user attributes comprises filling in the digital fillable field using the privacy-preserving argument.

8. The method of claim 1, wherein submitting the request for the verifiable credential to the issuer comprises:
generating the request for the verifiable credential utilizing a cryptographic key associated with the client device, a master credential issued the issuer, and the user attribute associated with the additional layer of the multi-tier user identity model of the client device; and
transmitting the request to the issuer for issuance of the verifiable credential.

9. A non-transitory computer-readable medium storing executable instructions, which when executed by a processing device, cause the processing device to perform operations comprising:
maintaining, within storage, a multi-tier user identity model for a client device, the multi-tier user identity model comprising a layer for verifiable credentials of the client device and an additional layer for unverified user attributes of the client device;
submitting, to an issuer of verifiable credentials, a request for a verifiable credential that includes a user attribute associated with the additional layer of the multi-tier user identity model of the client device;
associating, in response to receiving the verifiable credential including the user attribute from the issuer, the user attribute with the layer for verifiable credentials of the multi-tier user identity model of the client device for verifiable credentials;
receiving a digital document comprising one or more digital fillable fields for the client device;
retrieving, for the client device and in response to receiving the digital document, one or more verifiable credentials from the layer for verifiable credentials of the multi-tier user identity model of the client device; and
modifying, by the at least one processing device, the digital document by filling in the one or more digital fillable fields using one or more user attributes of the one or more verifiable credentials.

10. The non-transitory computer-readable medium of claim 9, wherein maintaining the multi-tier user identity model for the client device comprises maintaining, within the multi-tier user identity model, a further layer for a decentralized identifier of the client device.

11. The non-transitory computer-readable medium of claim 9, wherein submitting the request to the issuer comprises submitting the request to a decentralized issuer of a decentralized identity framework.

12. The non-transitory computer-readable medium of claim 9, wherein:
the operations further comprise determining, utilizing a fuzzy matching algorithm, that the one or more user attributes of the one or more verifiable credentials correspond to the one or more digital fillable fields; and
filling in the one or more digital fillable fields using the one or more user attributes is based on determining that the one or more user attributes correspond to the one or more digital fillable fields.

13. The non-transitory computer-readable medium of claim 9, wherein the operations further comprise:
determining, utilizing a fuzzy matching algorithm, that an additional digital fillable field of the digital document is unrelated to the one or more user attributes of the one or more verifiable credentials; and
modifying the digital document by filling in the additional digital fillable field based on one or more user interactions with the additional digital fillable field.

14. The non-transitory computer-readable medium of claim 9, wherein the operations further comprise verifying an additional user attribute of an additional client device associated with the digital document by:
providing, to the additional client device, a verification challenge for verifying the additional user attribute;
receiving a signature of the additional client device in response to providing the verification challenge;
validating the signature to determine that the additional client device holds a cryptographic key corresponding to an additional decentralized identity credential associated with the additional user attribute; and
validating a signature of a decentralized issuer that issued the additional decentralized identity credential.

15. The non-transitory computer-readable medium of claim 14, wherein the operations further comprise, in response to verifying the additional user attribute of the additional client device, providing a verification indication for display on the client device.

16. A system comprising:
one or more memory components;
and one or more processing devices coupled to the one or more memory components, the one or more processing devices to perform operations comprising:
maintaining, within storage, a multi-tier user identity model for a client device, the multi-tier user identity model comprising a layer for verifiable credentials of the client device and an additional layer for unverified user attributes of the client device;
submitting, to an issuer of verifiable credentials, a request for a verifiable credential that includes a user attribute associated with the additional layer of the multi-tier user identity model of the client device;
associating, in response to receiving the verifiable credential including the user attribute from the issuer, the user attribute with the layer for verifiable credentials of the multi-tier user identity model of the client device;
providing, for display on a graphical user interface of the client device, a digital document comprising one or more digital fillable fields;
retrieving, from the layer for verifiable credentials of the multi-tier user identity model of the client device, one or more verifiable credentials for the client device;
modifying the digital document within the graphical user interface of the client device by filling in the one or more digital fillable fields using one or more user attributes of the one or more verifiable credentials; and providing, for display within the graphical user interface next to a digital fillable field of one or more digital fillable fields that has been filled with a user attribute of the one or more user attributes, a verification indication based on a verification of the user attribute of the one or more user attributes.

17. The system of claim 16, wherein the operations further comprise:
   detecting a user interaction with the graphical user interface for editing the digital fillable field;
   removing, in response to the user interaction, the verification indication from display next to the digital fillable field; and
   modifying the user attribute of the one or more user attributes within the digital fillable field based on detecting one or more additional user interactions.

18. The system of claim 17, wherein: the operations further comprise providing, for display within the graphical user interface, an interactive list of user attributes represented in the digital document, the interactive list of user attributes comprising an interactive element corresponding to the user attribute of the one or more user attributes within the digital fillable field; and
   detecting the user interaction with the graphical user interface for editing the digital fillable field comprises detecting an interaction with the interactive element corresponding to the user attribute of the one or more user attributes within the digital fillable field.

19. The system of claim 16, wherein filling in the one or more digital fillable fields using the one or more user attributes comprises filling at least one digital fillable field using a privacy-preserving argument that indicates at least one user attribute from the one or more user attributes that satisfies a threshold while preventing other client devices associated with the digital document from accessing the at least one user attribute that satisfies a threshold.

20. The system of claim 16, wherein the operations further comprise modifying the digital document by filling in one or more additional digital fillable fields that are unrelated to the one or more verifiable credentials based on user interactions with the one or more additional digital fillable fields via the graphical user interface.

\* \* \* \* \*